(12) United States Patent
Zhang et al.

(10) Patent No.: US 9,482,771 B2
(45) Date of Patent: Nov. 1, 2016

(54) METHOD OF INDICATING THE PRESENCE OF GAS HYDRATE AND SHALLOW GAS IN DEEPWATER ENVIRONMENT

(71) Applicant: Fugro Marine Geoservices, Inc., Houston, TX (US)

(72) Inventors: Zijian Zhang, Houston, TX (US); Daniel McConnell, Houston, TX (US)

(73) Assignee: Fugro Marine Geoservices, Inc., Houston, TX (US)

( * ) Notice: Subject to any disclaimer, the term of this patent is extended or adjusted under 35 U.S.C. 154(b) by 480 days.

(21) Appl. No.: 14/072,450

(22) Filed: Nov. 5, 2013

(65) Prior Publication Data

US 2014/0129147 A1 May 8, 2014

Related U.S. Application Data

(60) Provisional application No. 61/722,561, filed on Nov. 5, 2012.

(51) Int. Cl.
| | | |
|---|---|---|
| *G06F 19/00* | (2011.01) | |
| *G01V 1/30* | (2006.01) | |
| *E21B 49/08* | (2006.01) | |
| *E21B 43/01* | (2006.01) | |

(52) U.S. Cl.
CPC ............. *G01V 1/306* (2013.01); *E21B 49/088* (2013.01); *E21B 2043/0115* (2013.01); *G01V 2210/632* (2013.01); *G01V 2210/647* (2013.01)

(58) Field of Classification Search
CPC ........ G01V 3/083; G01V 3/12; G01V 1/282; G01V 1/288
USPC ............................ 702/6–14, 24, 25, 182–185
See application file for complete search history.

(56) References Cited

U.S. PATENT DOCUMENTS

| | | |
|---|---|---|
| 5,661,697 A | 8/1997 | Swan et al. |
| 5,696,378 A | 12/1997 | Busch et al. |
| 2003/0110018 A1 | 6/2003 | Dutta et al. |
| 2006/0062084 A1 | 3/2006 | Drew |
| 2006/0203613 A1* | 9/2006 | Thomsen ............... G01V 3/083 367/38 |
| 2008/0271885 A1 | 11/2008 | Kaminsky |

(Continued)

OTHER PUBLICATIONS

Notification concerning transmittal of international preliminary report on patentability and written opinion of the international searching authority, of mailing date May 14, 2015 based on International application No. PCT/US13/68536, 8 pages.

(Continued)

*Primary Examiner* — Edward Raymond
(74) *Attorney, Agent, or Firm* — Charles Knobloch; Arnold, Knobloch & Saunders, L.L.P.

(57) ABSTRACT

A method for indicating the presence of free gas charged sands, and/or hydrates over free gas, and/or hydrates not over free gas, the method using well log data and a rock physics model. Velocity and density of background clays and sands are extracted from the well log data. The extracted velocities and densities are used to build a rock physics model. An AVO response is generated that is representative of free gas-charged sands. An AVO response is generated that is representative of hydrates over free gas-charged sands. An AVO response is generated that is representative of hydrates devoid of free gas. The generated AVO responses are used to construct an AVO crossplot diagram that is further used to distinguish deposits of free gas charged sands from hydrates over free gas, from hydrates not over free gas.

20 Claims, 16 Drawing Sheets

(56) References Cited

U.S. PATENT DOCUMENTS

| | | |
|---|---|---|
| 2008/0319674 A1 | 12/2008 | Dai et al. |
| 2009/0306899 A1 | 12/2009 | Harris et al. |
| 2010/0128982 A1 | 5/2010 | Dvorkin et al. |
| 2010/0312534 A1 | 12/2010 | Xu et al. |
| 2011/0083844 A1 | 4/2011 | Oppert et al. |

OTHER PUBLICATIONS

Notification of transmittal of the international search report and the written opinion of the international searching authority, or the declaration of mailing date Jan. 14, 2014 based on International application No. PCT/US13/68536, 10 pages.

Foster, Douglas J. et al: "Interpretation of AVO anomalies," Geophysics, Society of Exploration Geophysicists, US, vol. 75, No. 5, Sep. 1, 2010. pp 75A3-75A13, XP001557869, ISSN: 0016-8033, DOI: 10.1190/1.3467825.

Castagna, John P. et al: "Principles of AVO Crossplotting", The Leading Edge, Society of Exploration Geophysicists, US, vol. 16, No. 4, Apr. 1, 1997 (Apr. 1, 1997), pp. 337-342, XP000690150, ISSN: 1070-485X, DOI: 10.1190/1.1437626.

Li, Yongyi et al: "Practical aspects of AVO modeling", The Leading Edge, Society of Exploration Geophysicists, US, vol. 26, No. 3, Mar. 1, 2007 (Mar. 1, 2007), pp. 295-296, 298, XP001504876, ISSN: 1070-465X, DOI: 10.1190/1.2715053.

Communication of European Search Report issued Sep. 7, 2016 in co-pending European application No. 13850532.6 from European Patent Office, 11 pages.

\* cited by examiner

METHOD OF INDICATING THE PRESENCE OF GAS HYDRATE AND SHALLOW GAS IN DEEPWATER ENVIRONMENT

CROSS REFERENCE TO RELATED APPLICATIONS

This application claims the benefit of U.S. Provisional Application No. 61/722,561, filed Nov. 5, 2012.

BACKGROUND OF THE INVENTION

1. Field of the Invention

Examples of the subject matter disclosed herein generally relate to methods and systems for indicating the presence of gas hydrate and shallow gas which includes the use of seismic data, in particular methods for indicating that include the use of AVO responses in seismic data.

2. Discussion of Background

Although seismic amplitude is affected by many factors, AVO techniques have shown to be useful for direct hydrocarbon indication over the past three decades, especially for gas sand reservoir in the clastic depositional settings. In contrast, the application to identify shallow gas and gas hydrate has not reached the same level. Gas hydrates refer to naturally occurring solid composed of crystallized water (ice) molecules containing molecules of natural gas, which may be mainly methane and higher order hydrocarbons. When the term hydrate is used in the context of this application, gas hydrates are meant. Ecker et al. (1998) use rock physics-based AVO modeling to investigate the internal structure of hydrate-bearing sediments offshore Florida. Carcione and Tinivella (2000) compute AVO curves for consolidated Berea sandstone with gas hydrate and free gas. Furthermore, a few studies attempt to separate hydrate-bearing sediments (gas hydrate without free gas below) from hydrate-over-gas sediments (gas hydrate overlies free gas) from seismic amplitude; both are drilling hazards but different drilling strategies and protocols should be applied. The present invention provides a novel AVO modeling technique found to robustly and reliably perform the differentiation.

In Shuey's two-term approximation to the Zoeppritz equations, the P-wave reflection coefficient can be approximately written as a function with two parameters: AVO intercept (A) and AVO gradient (B) (Shuey, 1985). In general, deepwater sediments follow normal compaction processes, which define background trends. AVO anomalies can be observed from the crossplot of the intercept and gradient because they deviate from the background trend. Rutherford and Williams divided AVO anomalies into three categories (Classes I, II and III) based on normal incidence reflection coefficient (1989). Castagna and others proposed an additional category, Class IV, and presented the anomalies in terms of locations in the crossplot (Castagna et al., 1997 and Castagna and Swan, 1998). In this study, we investigate the AVO anomalies related to gas hydrate and/or free gas by simulating their AVO reflection coefficient responses and intercept and gradient in the A-B plane.

The AVO classification presented by Rutherford and Williams (1989) and Castagna and Swan (1997) has become the industry standard for AVO analysis for oil and gas exploration. They classify gas sand responses into four classes. Class I is high impedance sand underlying low impedance shale and has a positive intercept and negative gradient for top of gas sand. Class II is characterized by a small impedance contrast for which the impedance of the sand is about the same as the overlying shale, the gradient is negative and the intercept may be negative or positive. Class III has a low impedance sand underlying high impedance shale characterized by increasing amplitude with offset; Class IV also has low impedance sand underlying high impedance shale but exhibits amplitude decreasing with offset. Thus the intercepts are negative for both Class III and Class IV whereas the gradients are negative for Class III and positive for Class IV.

BRIEF SUMMARY OF THE INVENTION

In one example, A method is disclosed for indicating the presence of free gas charged sands, and/or hydrates over free gas, and/or hydrates not over free gas, the method using well log data and a rock physics model. Velocity and density of background clays and sands are extracted from well log data. A rock physics model is built. AVO responses for free gas charged sands are generated. AVO responses for hydrates over free gas are generated. AVO responses for hydrates (not over free gas) are generated. The three sets of AVO responses are cross-plotted onto an AVO cross-plot diagram.

In one example, pre-stack seismic data is used to construct an AVO cross-plot diagram. The constructed AVO cross-plot diagram is compared to the AVO cross-plot diagram of the three sets of AVO responses. From the comparison, gas and hydrate concentration estimates from the seismic data are derived.

In one example, a method is disclosed for indicating the presence of gas hydrate bearing sediments. The method includes: obtaining elastic model parameters from a well log and a rock physics model; synthesizing a plurality of AVO behaviors from the elastic model parameters wherein an AVO behavior is defined as the variation of seismic reflection amplitude with source-to-receiver offset angle; calculating an AVO intercept and AVO gradient pair from each synthesized AVO behavior; estimating a background trend of AVO gradients and AVO intercepts representing no gas or hydrates; identifying, from the plurality of AVO gradient-intercept pairs, a first grouping of intercept pairs representing AVO behaviors for low saturation gas hydrates overlying either gas sands or water sands; identifying a second grouping of pairs representing AVO behaviors for high saturation gas hydrates overlying either gas sands or water sands; from the second grouping of pairs, identifying a sub-grouping of pairs representing AVO behaviors for high saturation gas hydrates overlying gas sands; wherein the AVO gradient and the AVO intercept pairs identified in the first grouping are proximate to the background trend; wherein the AVO gradient and the AVO intercept pairs identified in the second grouping are not in the first grouping and have positive AVO gradients and negative AVO intercepts; and wherein the AVO gradient and the AVO intercept pairs identified in the sub-grouping have AVO intercepts more negative than −0.3.

In one example, a method is disclosed for indicating the presence of gas hydrate bearing sediments. The method includes: activating a seismic source in at least one location to propagate seismic waves into the earth, using a plurality of seismic sensors spaced apart from the seismic source to detect seismic waves reflected from sediments; generating a velocity volume; extracting a trace from a spatial location from the velocity volume; generating a synthetic rock physics model having a gas hydrate saturation parameter; generating a synthetic AVO model for the extracted trace spatial location, the synthetic AVO model based upon the synthetic rock physics model; extracting a response AVO model for the extracted trace spatial location, the response AVO model based upon the detected seismic waves; correlating the synthetic AVO model with the response AVO model; comparing the correlation with a correlation threshold; performing, based on the comparison of the correlation with said correlation threshold: adjusting at least one parameter of the synthetic rock physics model based on the correlation of the synthetic AVO model with the response AVO model; repeating the generating a synthetic AVO model step based on the adjusted synthetic rock physics model; and repeating the correlating the synthetic AVO model with the response AVO model step using the repeated generated synthetic AVO model; and generating an indicator trace representing gas hydrate saturation at the extracted trace spatial location, the indicator trace based on at least one gas hydrate saturation parameter of the rock physics model.

A method is disclosed for prospecting for gas hydrates. The method includes: coring a gas hydrate deposition deposited in the earth, whereby a core sample is obtained; determining a volume of extracted gas from the core sample; calibrating a rock physics model based on the volume measurement; generating a synthetic AVO seismic response model based on the rock physics model; comparing the synthetic AVO seismic response model to a derived AVO seismic response, the derived AVO seismic response derived from seismic data soundings of the gas hydrate deposition; and identifying locations of the gas hydrate deposition based on: a) the comparison of the synthetic AVO seismic response model to said derived AVO seismic response; and b) one or more additional derived AVO seismic responses derived from seismic data soundings. In an example, the step of determining a volume is by direct method. In an example, the step of determining a volume is by degassing the core sample. In an example, the step of determining a volume is by indirect method. In an example, the step of determining a volume is by x-raying the core sample. In an example, the step of determining a volume is based in part by measuring pore water chlorinity of the core sample.

In a further example, method is disclosed for: extracting an AVO behavior from pre-stack seismic data at a location; calculating an AVO intercept and AVO gradient pair for the extracted seismic AVO behavior; comparing the calculated seismic AVO intercept and AVO gradient pair to the first grouping, second grouping, and sub-grouping; and determining the presence of hydrate or hydrate-over-gas sediments from the comparison. In further example, method is disclosed for storing the location of the determined presence of hydrate or hydrate-over-gas sediments in a non-transient computer readable storage medium.

In a further example, the elastic model parameters include Vp, Vs, and density.

In a further example, obtaining elastic model parameters include: extracting a Vp value and a density value from a well log; estimating and calibrating a shear modulus in the rock physics model; and deriving an S-wave velocity from the density and the estimated and calibrated shear modulus.

In a further example, obtaining elastic model parameters include at least one of:

a) extracting a Vp value and a density of clay value from a well log measurement logged at a location above a gas hydrate reservoir; estimating and calibrating a shear modulus in the rock physics model; deriving an S-wave velocity for clay from the density and the estimated and calibrated shear modulus;

b) extracting a Vp value and a density value from a well log measurement logged at a location in a water-bearing sand; estimating and calibrating a density and shear modulus in the rock physics model; deriving an S-wave velocity for water-bearing sand from the density and the estimated and calibrated shear modulus;

c) extracting a Vp value and a density value from a well log measurement logged at a location in a hydrate-bearing sand; estimating and calibrating a density and shear modulus in the rock physics model; deriving an S-wave velocity for hydrate-bearing sand from the density and the estimated and calibrated shear modulus;

d) extracting a Vp value and a density value from the a well log measurement logged at a location in a free-gas-charged sand; estimating and calibrating a density and shear modulus in the rock physics model; and deriving an S-wave velocity for free-gas-charged sand from the density and the estimated and calibrated shear modulus.

In a further example, obtaining elastic model parameters includes: computing P-wave velocity, S-wave velocity, and density of hydrate-bearing and free-gas-charged sands from the rock physics model using at least one of: Hashin-Shtrikman bounds, Hertz-Mindlin contact theory, and Gassman fluid substitution; and calibrating the computation of P-wave velocity, S-wave velocity, and density using measured log data and estimated hydrate saturation from one or more resistivity logs.

In a further example, synthesizing an AVO behavior includes applying Shuey's approximation.

In a further example, the methods are used for identifying subsurface drilling hazards in deepwater.

In a further example, the methods are used for differentiating hydrate-over-gas bearing sediment drilling hazards from hydrate-bearing sediments, without free gas below, drilling hazards.

In an example, disclosed is a tangible computer readable medium having computer executable logic recorded thereon, including: code for reading a rock physics model; code for generating AVO responses for free gas charged sands from the rock physics model; code for generating AVO responses for hydrates over free gas from the rock physics model; code for generating AVO responses for hydrates, not over free gas, from the rock physics model; and code for cross-plotting the three sets of AVO responses onto an AVO cross-plot diagram. In a further example, disclosed is a computer system configured to execute the code.

In a further example, the tangible computer readable medium includes: code for reading pre-stack seismic data; code for constructing an AVO cross-plot from the pre-stack seismic data; code for comparing the AVO cross-plot from the pre-stack seismic data with the AVO cross-plot of the three sets of AVO responses; and code for deriving gas and hydrate concentration estimates from the comparison. In a further example, the tangible computer readable medium includes: code for displaying the AVO cross-plot from the pre-stack seismic data with the AVO cross-plot of the three sets of AVO responses.

DETAILED DESCRIPTION

U.S. Provisional Application No. 61/722,561, filed Nov. 5, 2012 for METHOD OF INDICATING THE PRESENCE OF GAS HYDRATE AND SHALLOW GAS IN DEEPWATER ENVIRONMENT by Zijian Zhang and Daniel McConnell is herein incorporated by reference in its entirety.

An analysis of amplitude variation with offset (AVO) observations is applied in hydrate-bearing sands, free-gas-charged sands, and hydrate-over-gas sands. The elastic model parameters (Vp, Vs, and density) are obtained from well log measurements and a rock physics model. In one example, a rock physics model is a representation of geologic lithology and/or stratigraphy which typically includes information relating to the physical and acoustic properties of geologic units. For example, Vp, Vs, density, porosity, thickness, sand content, clay content, water content, gas content, gas hydrate content, layering, mineralogy, saturation, pore fill type are just examples of information that may be contained in a rock physics model. The study suggests that presence of gas hydrate and free gas affect the AVO of shallow unconsolidated sediments containing gas hydrate and free gas. Low-concentrated gas hydrate and low-concentrated gas hydrate overlying free gas have weak AVO behaviors while highly-concentrated gas hydrate and highly-concentrated gas hydrate overlying free gas have strong AVO behaviors. Both highly-concentrated gas hydrate and highly-concentrated gas hydrate overlying free gas are Class I AVO anomalies but the intercept of AVO is stronger negative for highly-concentrated gas hydrate overlying free gas. They may occur in different locations in the AVO intercept and gradient plane.

Shallow gas and gas hydrate are two of the principal subsurface drilling hazards in deepwater. Shallow gas should be identified and avoided in the uppermost tophole section where casing is not set due to insufficient sediment strength. There is also increasing interest in evaluating the resource potential for concentrated gas hydrate sands. Whether there is subjacent gas under the gas hydrate deposits and their relative quantities is important to know when designing potential production strategies. In 2009, the Gulf of Mexico Gas Hydrate Joint Industry Project Leg II (JIP Leg II) drilled three Logging-while-drilling (LWD) sites to test the potential occurrence of gas hydrate in sandy sediments in Green Canyon 955 (GC 955). The LWD data allowed for the study of AVO for interpreting seismic amplitude anomalies on free-gas charged sands, hydrate-bearing sands, and hydrate-over-free-gas sands.

Figure 1:
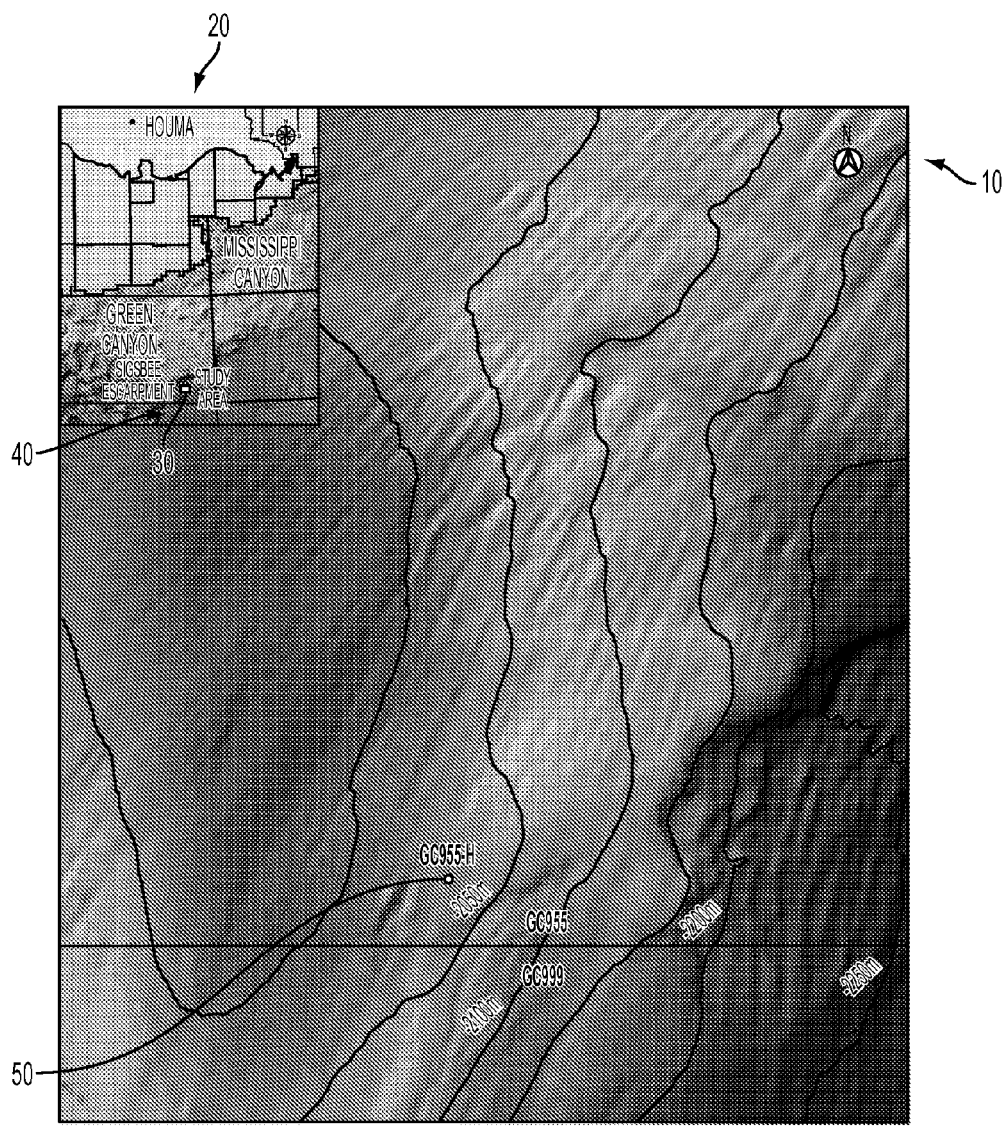
FIG. 1 discloses a map view of a deep water sea floor topography map with inset index map, of a target prospect area for identifying shallow gas and gas hydrate bearing sediments.

FIG. 1 discloses a map view of a deep water sea floor topography map 10 with inset index map 20, of a target prospect area for identifying shallow gas and gas hydrate bearing sediments. The study area 30 shown is at GC955 with water depths of 2,000-2,200 m, located on the middle continental slope in the northern Gulf of Mexico. The GC955 site is about 2,000-3,000 m southeast of the Green Canyon re-entrant on the base of the Sigsbee Escarpment 40. Well GC955-H, well 50, is shown on the map 10. Shallow sediments are predominantly composed of hemipelagic fine-grained sediments in the Gulf of Mexico. However, there is a large submarine fan, the Mississippi Fan, which was deposited in the deepwater of the Gulf of Mexico during late Pliocene and Pleistocene in the shallow-section sediments at the GC955 site. Shelf-margin deltas were developed and channel-levee systems were deposited during sea level low stands. These channel-levee systems transported coarse-grained sediment from the continental margin to the slope via submarine canyons. When sea level rose during later geologic time, hemipelagic clays dominated the marine sedimentation in the area. Salt movement has generated numerous regional and local growth faults, which provide good migration paths for hydrocarbons. Under favorable conditions of temperature and pressure, gas hydrate can form from thermogenic gas when migrating from the deep section into shallow section.

Figure 2:
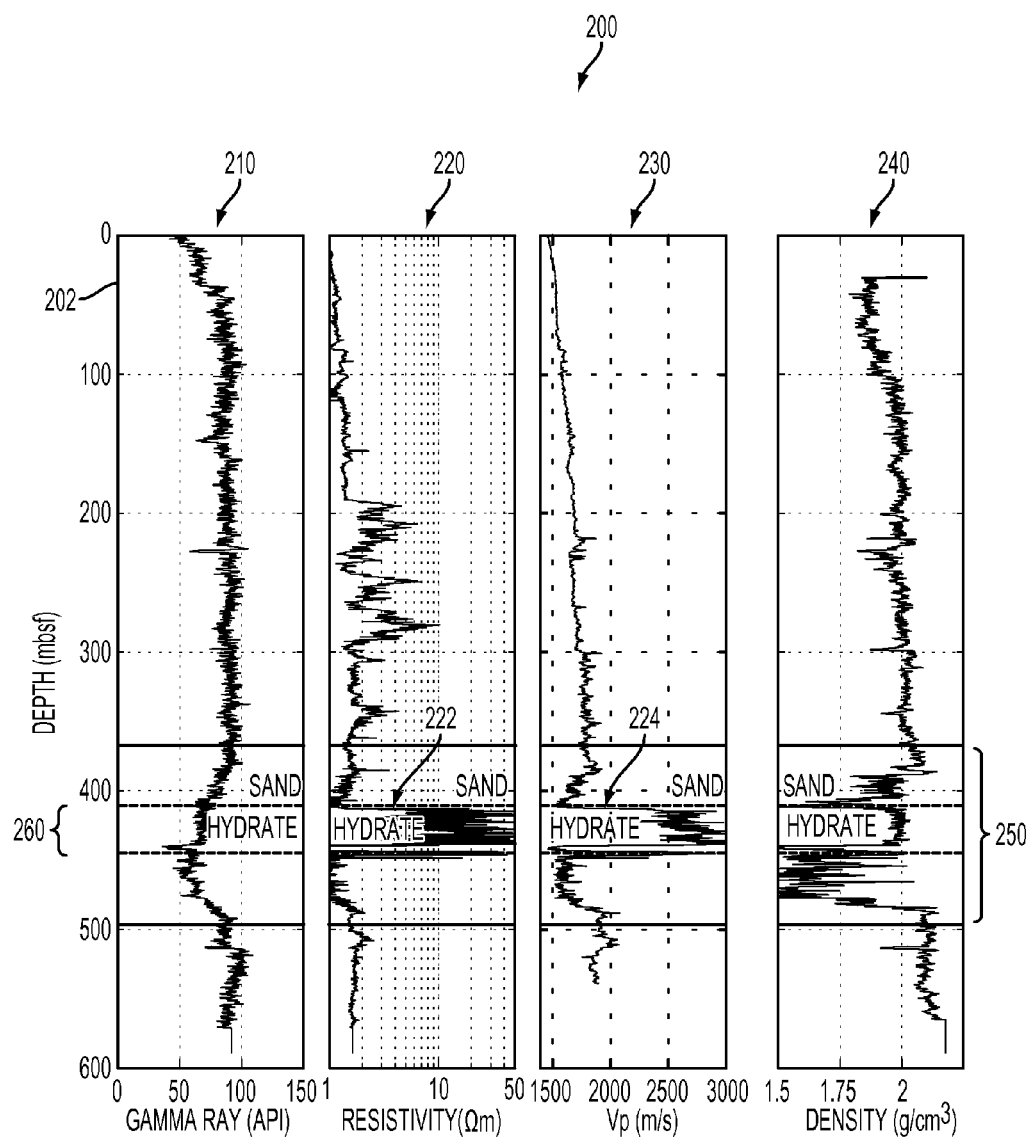
FIG. 2 discloses depth plots from a geophysical well log indicating shallow sand sediments and gas hydrate bearing sediments, the well log including Gamma Ray, Resistivity, Vp and Density curves.

FIG. 2 discloses a log view of a well log 200 indicating shallow sand sediments and gas hydrate bearing sediments, the well log including Gamma Ray, Resistivity, Vp and Density curves. FIG. 2 shows the Gamma Ray 210, Resistivity 220, Vp 230, and density 240 log curves measured from sites GC955-H. The vertical axis 202 of the log curves is shown in meters below sea floor (msbf). The horizontal axes show the log curves' respective measurement scale, namely, API for Gamma Ray 210, ohm-meter for Resistivity 220, meters per second for Vp 230 (velocity of compressional wave), grams per cubic centimeter for Density 240. Note the sharp increase of both resistivity 222 and P-wave velocity 224 in the well log display. Resistivity increases from 1 to 50 ohm-m and sonic velocity increases from about 1.6 km/s to 2.8 km/s between 410 and 450 mbsf. Gamma ray decreases from about 100 API to 50 API between 375 mbsf and 490 mbsf, indicating that highly-concentrated gas hydrate 260 occurs in a sand section 250. The highest gas hydrate saturations estimated from resistivity logs in this section exceed 70% (Guerin et al., 2009).

Figure 3:
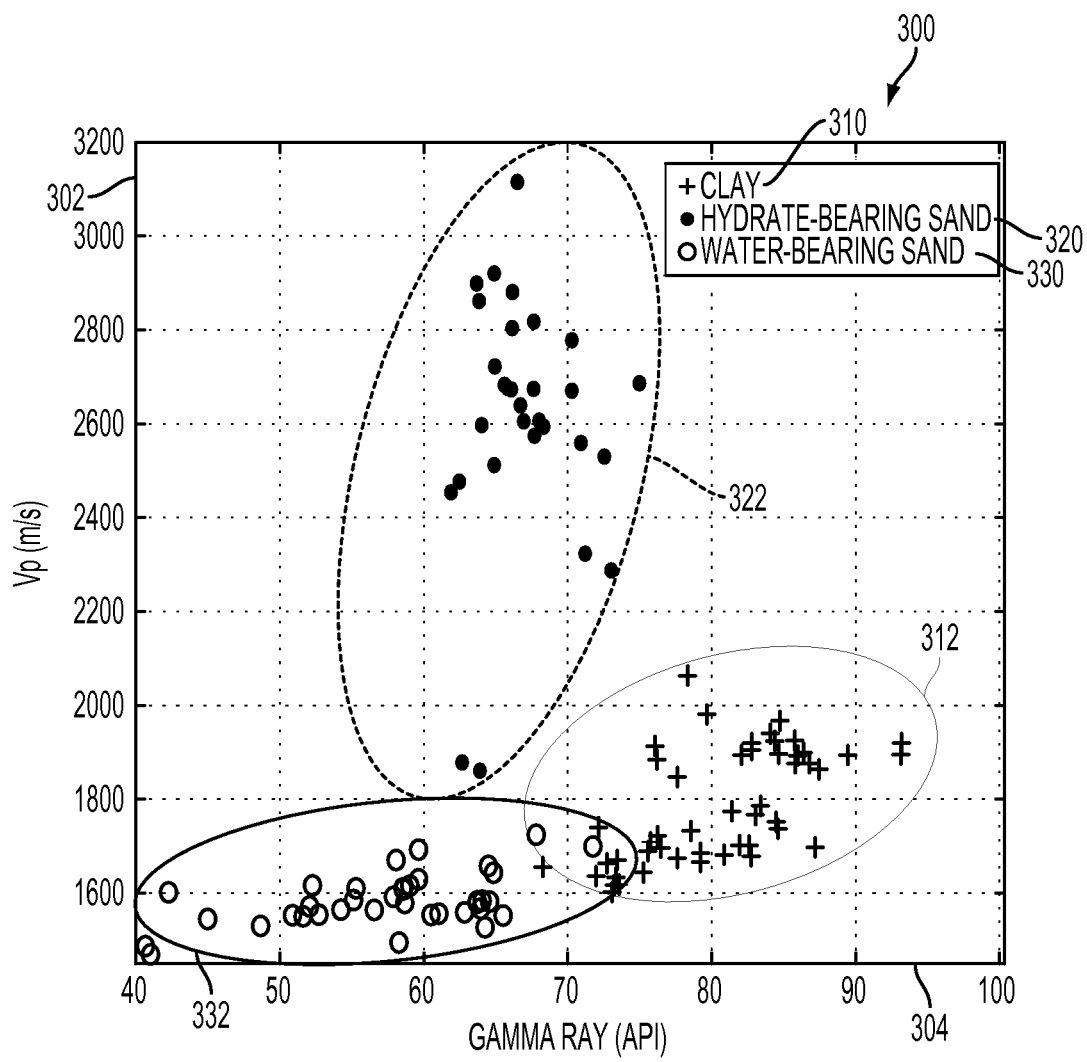
FIG. 3 discloses a cross-plot graph view of P-wave velocity vs Gamma Ray values extracted from portions of a well log.

FIG. 3 discloses a cross-plot view of P-wave velocity and Gamma Ray values extracted from portions of a well log. FIG. 3 illustrates the crossplot 300 of the P-wave velocity and Gamma Ray from portions of the logs in FIG. 2. The vertical axis 302 is shown in meters per second and represents the extracted velocity value from Vp log curve 230. The horizontal axis 304 is shown in API measurement and represents the extracted Gamma Ray value from Gamma Ray log curve 210. For a given depth below sea floor, a velocity value is extracted from Vp log curve 230 along with a corresponding API value extracted from Gamma Ray log curve 210 for that depth. The values are marked on crossplot 300. Extracted data values 310 from clay regions of the log 200 are shown with a "+" indicator on crossplot 300. Extracted data values 320 from hydrate bearing sand regions of the log 200 are shown with a solid circle indicator on crossplot 300. Extracted data values 330 from water-bearing sand regions of the log 200 are shown with an open circle indicator on crossplot 300. From the crossplot 300, it can be seen that cross-plot values associated with clays cluster in a clay region 312 of crossplot 300, that cross-plot values associated with hydrate-bearing sands cluster in a hydrate-bearing sand region 322 of crossplot 300, and cross-plot values associated with water-bearing sands cluster in the water-bearing sand region 332 of crossplot 300. FIG. 3 suggests that water-bearing sands have relatively lower velocities than clays, whereas hydrate-bearing sands are characterized by high velocities.

For the purpose of synthetic AVO modeling, P-wave velocity, S-wave velocity, and density of hydrate-bearing and free-gas-charged sands with respect to hydrate saturations were computed, in one example, from a rock physics model using the Hashin-Shtrikman bounds, Hertz-Mindlin contact theory, and Gassman fluid substitution. The computation was calibrated by measured log data and estimated hydrate saturation from resistivity logs.

The goal of AVO analysis is to investigate reflection coefficient or amplitude responses on different sand models with respect to gas hydrate saturation and free gas saturation. In one example, the models are sufficiently constrained by well logs data and reasonable geologic environments. Although they may not precisely match real seismic data, synthetic AVO curves represent the effect of gas hydrate and free gas on seismic amplitude and provide guidance for plausible seismic explanations.

In one example, we computed synthetic AVO responses using the Shuey's approximation. The Vp and density of clay were extracted from well logs above gas hydrate reservoir. No S-wave velocity was available in the log data. S-wave velocity is derived from density and shear modulus; the latter has been estimated and calibrated in our rock physics model. Thus, we used the model to reasonably predict the S-wave velocity. Similarly, in further examples, the velocities and density of water-bearing, saturated hydrate-bearing, and free-gas-charged sands were computed from well logs and from the rock physics model.

Figure 4:
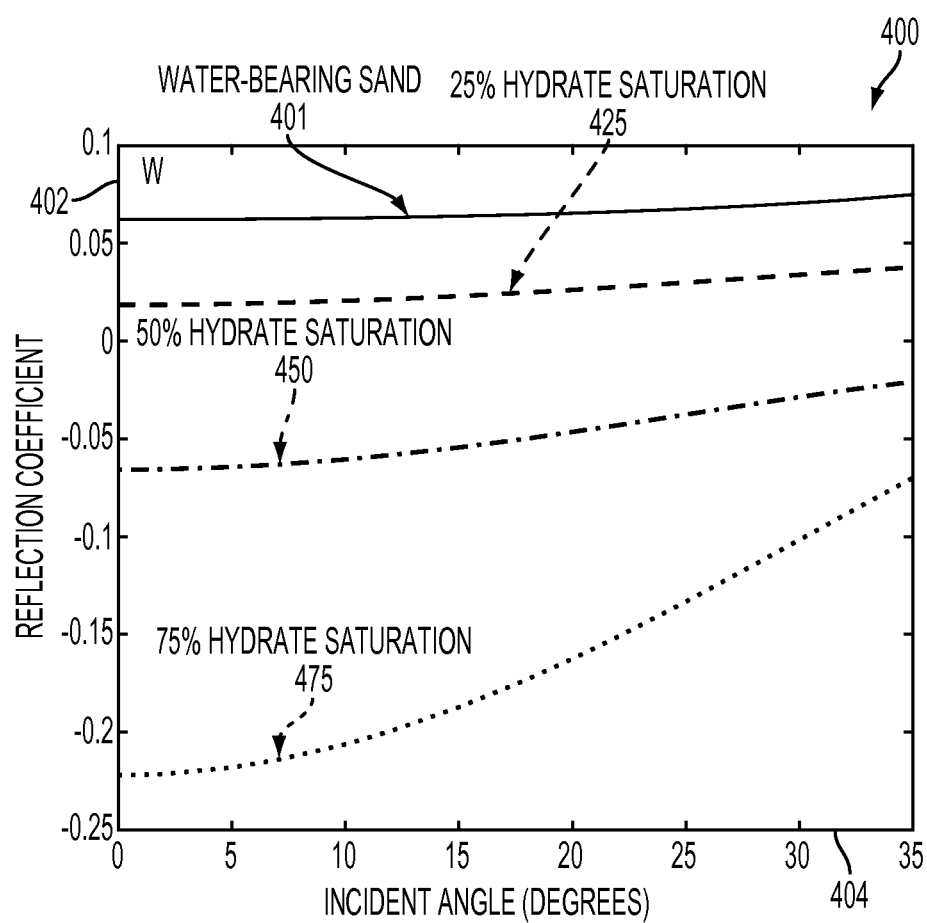
FIG. 4 discloses a graph view of synthetic AVO responses with respect to gas hydrate saturation, plotted as incident angle versus reflection coefficient.

FIG. 4 discloses a graph view of synthetic AVO responses with respect to gas hydrate saturation, plotted as incident angle versus reflection coefficient. FIG. 4 shows a graph 400 of Reflection Coefficient versus Incident Angle of reflected seismic waves reflected off sediments. The vertical axis 402 of graph 400 is shown in reflection coefficients ranging from −0.25 to 0.1. The horizontal axis 404 of graph 400 is shown in degrees of incident angle ranging from 0 to 35. A solid line 401 represents the reflection coefficient versus incident angle relationship for a water-bearing sand. A dashed line 425 represents the reflection coefficient versus incident angle relationship for sands containing 25% hydrate saturation. A dash-dotted line 450 represents the reflection coefficient versus incident angle relationship for sands containing 50% hydrate saturation. A dotted line 475 represents the reflection coefficient versus incident angle relationship for sands containing 75% hydrate saturation. These curves 401, 425, 450, 475 represent the AVO responses for sands of various degrees of gas hydrate saturation.

The trends of reflection coefficient changes with angle of incidence are affected by the gas hydrate saturation. The AVO responses are weak for low saturation gas hydrate, as indicated by line 425 of FIG. 4 for 25% gas hydrate saturation, in which the reflection coefficients or amplitude slightly increase with increasing angle of incidence and the trend is relatively flat. As hydrate saturation increases, the slope of the reflection coefficient curves increases. The response of high saturation gas hydrate, as indicated by line 475 of FIG. 4 for 75% gas hydrate saturation, shows a clear AVO anomaly; it has low reflection coefficient in zero offset and then a steeply increasing reflection coefficient in middle and far offsets.

Figure 5:
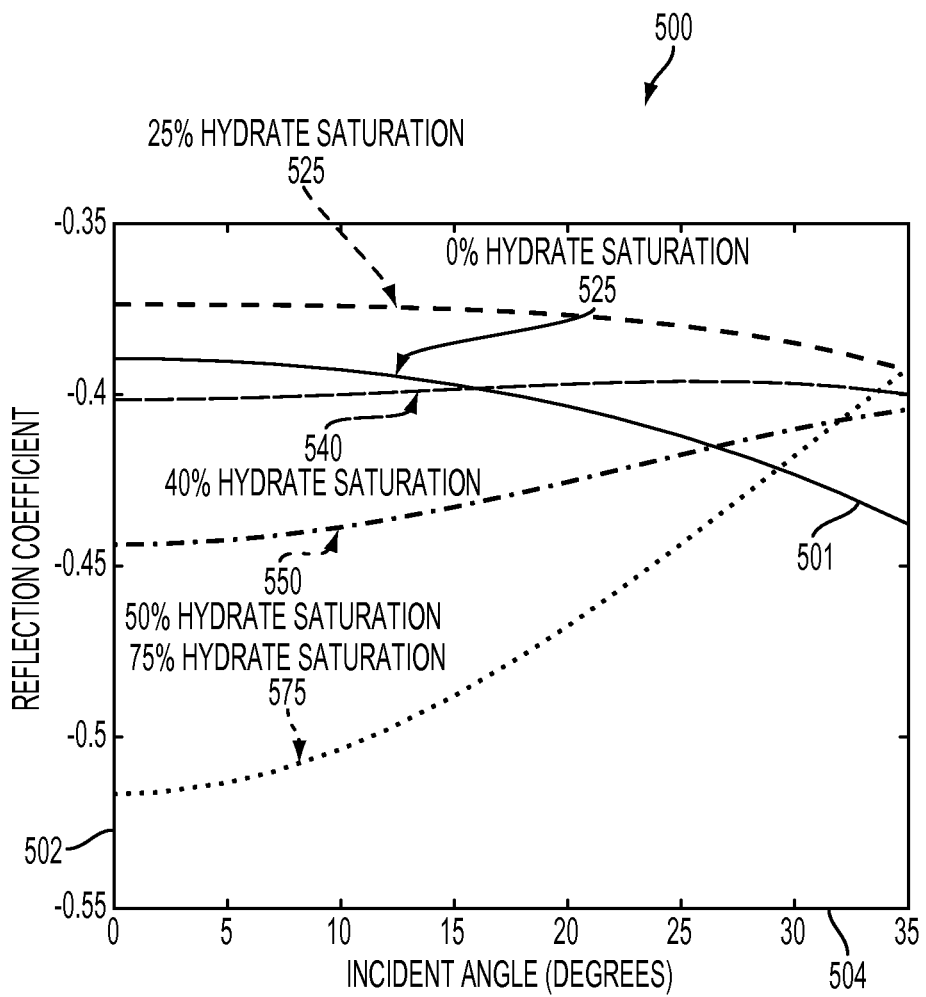
FIG. 5 discloses a graph view of synthetic AVO responses with respect to hydrate saturation where the hydrates overlie gas sands, plotted as incident angle versus reflection coefficient.

FIG. 5 discloses a graph view of synthetic AVO responses with respect to hydrate saturation where the hydrate is over gas sands, plotted as incident angle versus absolute reflection coefficient. FIG. 5 shows a graph 500 of Reflection Coefficient versus Incident Angle of seismic waves reflected off sediments. The vertical axis 502 of graph 500 is shown in reflection coefficients ranging from −0.55 to −0.35. The horizontal axis 504 of graph 500 is shown in degrees of incident angle ranging from 0 to 35. A solid line 501 represents the reflection coefficient versus incident angle relationship for sands with 0% hydrate saturation. An open-dashed line 525 represents the reflection coefficient versus incident angle relationship for sands with 25% hydrate saturation overlying gas bearing sand. A close-dashed line 540 represents the reflection coefficient versus incident angle relationship for sands with 40% hydrate saturation overlying gas bearing sand. A dash-dotted line 550 represents the reflection coefficient versus incident angle relationship for sands with 50% hydrate saturation overlying gas bearing sand. A dotted line 575 represents the reflection coefficient versus incident angle relationship for sands with 75% hydrate saturation overlying gas bearing sand. These curves 501, 525, 540, 550, 575 represent the AVO responses for sands with various degrees of gas hydrate saturation overlying a gas bearing sand.

FIG. 5 shows gas effect results in larger absolute reflection coefficients or amplitudes in hydrate over gas sands than hydrate bearing sands. The absolute values of the reflection coefficients increase (more negative) with the increasing angle of incidence for free-gas-charged sands and low saturated hydrate-over-gas sands, while the absolute values of the reflection coefficients decrease with the increasing angle of incidence for high saturated hydrate-over-gas sands.

Figure 6:
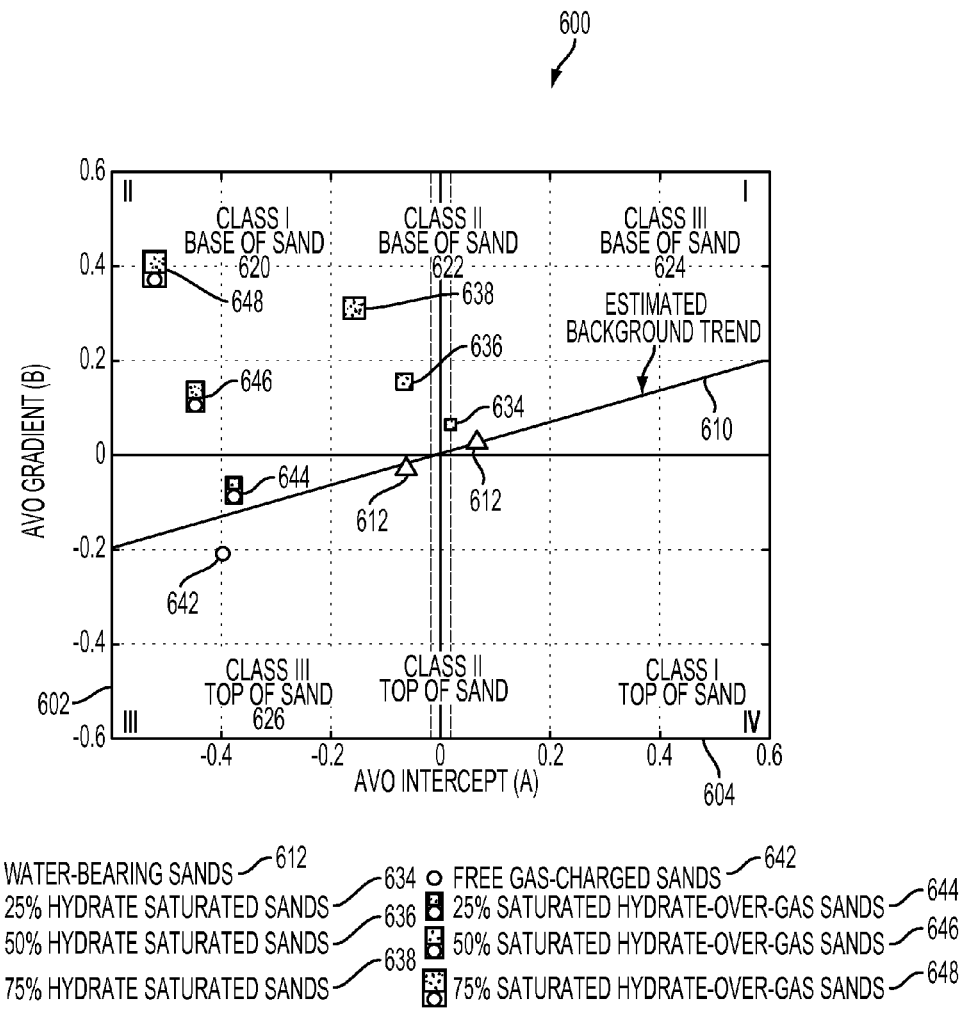
FIG. 6 discloses a cross-plot graph view of an AVO classification graph showing responses of hydrate bearing sands and hydrate-over-gas sands, plotted as AVO intercept versus AVO gradient.

FIG. 6 discloses a cross-plot graph 600 view of an AVO classification graph showing responses of hydrate bearing sands and hydrate-over-gas sands, plotted as AVO intercept versus AVO gradient. The vertical axis 602 of graph 600 is shown in AVO Gradient (B) values ranging from −0.6 to +0.6. The horizontal axis 604 of graph 600 is shown in AVO Intercept (A) values ranging from −0.6 to +0.6. Quadrants I, II, III, and IV are indicated in the corners of graph 600.

In one example, we use the classification presented by Rutherford and Williams (1989) and Castagna and Swan (1997) for hydrate-bearing sand and hydrate-over-gas sand. In one example, the AVO intercept and gradient are calculated from base of hydrate reflections and/or top of free gas reflections and shown in the crossplot plane.

AVO crossplot was designed to differentiate hydrocarbon-filling or other unusual sediments from background A versus B trends. Castagna and Swan indicate that the background trends pass through the origin and depend on Vp and Vp/Vs. The trends rotate toward the Y-axis for consolidated rock with Vp/Vs less than 2.5 while they rotate toward the X-axis for unconsolidated rock with Vp/Vs greater than 2.5.

The background trend for shallow, young water bearing sands exhibits a positive slope on a AVO gradient vs. AVO intercept cross-plot, which is opposite to the conventional wisdom of using a negative slope for background. The negative slope for background represents older, deeper sediments where traditional reservoirs lie. Since hydrates are typically in young, shallow deepwater sediments, this background line reflects this different gradient vs. intercept behavior. Recognizing this critical differentiator, where most practitioners assume a negative slope background, together with the concept of comparing behaviors to hydrate only sands, represents a breakthrough in thinking in this field of endeavor.

In our model of unconsolidated sediments, in one example, the estimated background trend 610 lies on the quadrants I and III that is consistent with their results. Water bearing sands 612, denoted by open triangles, coincide approximately with estimated background trend 610. The AVO anomalies for hydrate-bearing sands are Class I or II, which are located in quadrants I and II, as indicated by Class I Base of Sand region 620 and Class II Base of Sand region 622. A 25% hydrate saturated sand is shown on crossplot graph 600 with a stippled box 634. A 50% hydrate saturated sand is shown with a stippled box 636. A 75% hydrate saturated sand is shown with a stippled box 638. They show more negative intercept and more positive gradient for the higher hydrate saturations. This indicates that highly-concentrated hydrate-bearing sands may be clearly separated from water-bearing sands in the AVO crossplot, graph 600.

Gas sand is typically Class III AVO, as indicated by Class III Base of Sand Region 624 and Class III Top of Sand Region 626. With increasing hydrate saturation at the top of free gas, AVO gradients generally increase and, approaching background trends. Although the hydrate-over-gas sands exhibit Class IV behaviors, we do not emphasize the Class IV AVO in graph 600 of FIG. 6, because it nears the estimated background trend 610 and only small part of hydrate-over-gas sands below the trend in the quadrant III. On the other hand, Castagna and Swan define that Class IV should be in quadrant II in their paper (Castagna and Swan, 1997).

After crossing the background trend line 610, hydrate-over-gas sands move from quadrant III to quadrant II in the crossplot graph 600 and show Class I anomalies, as indicated by Class I Base of Sand region 620. Higher concentrated hydrate exhibit more obvious Class I anomalies, for example stippled box 638 (75% hydrate saturated sand) compared to stippled box 636 (50% hydrate saturated sand).

Free gas-charged sands, representing approximately no saturated hydrate, are indicated with an open circle 642 on crossplot graph 600. Open circle 642 occurs in Quadrant III of crossplot graph 600, below background line 610.

Hydrate-over-gas sands have similar gradients with hydrate-bearing sands but much higher absolute intercept. This is shown on crossplot graph 600 using a stippled box over open-circle box combination. A 25% saturated hydrate over gas sand is shown on crossplot graph 600 with a stippled box over open-circle box combination 644. A 50% hydrate saturated sand is shown with a box combination 646. A 75% hydrate saturated sand is shown with a box combination 648. In deepwater shallow section, in one example, the intercepts of A<−0.3 are considered as strong amplitude anomalies.

We have simulated and analyzed the AVO responses for hydrate-bearing sands, free-gas-charged sands, and hydrate-over-gas sands in deepwater environment. Our results indicate that the different AVO behaviors of these sediments are the consequence of different hydrate saturations and presence of free gas, and their interaction. Free gas-charged sands are Class III AVO while highly-concentrated hydrate-bearing sands and highly-concentrated hydrate-over-gas sands are Class I AVO anomalies. These AVO anomalies show apparent deviations from the background intercept versus gradient trend. Highly-concentrated hydrate-over-gas sands have very strong negative AVO intercept, which shows that highly-concentrated hydrate with free gas below can be separated from highly concentrated hydrate sands (that do not have significant free gas below). Thus, this new AVO analysis method is a useful tool for drilling hazard assessments to indicate the presence of gas hydrate and shallow gas in deepwater environment and for designing gas hydrate production strategies.

Figure 7:
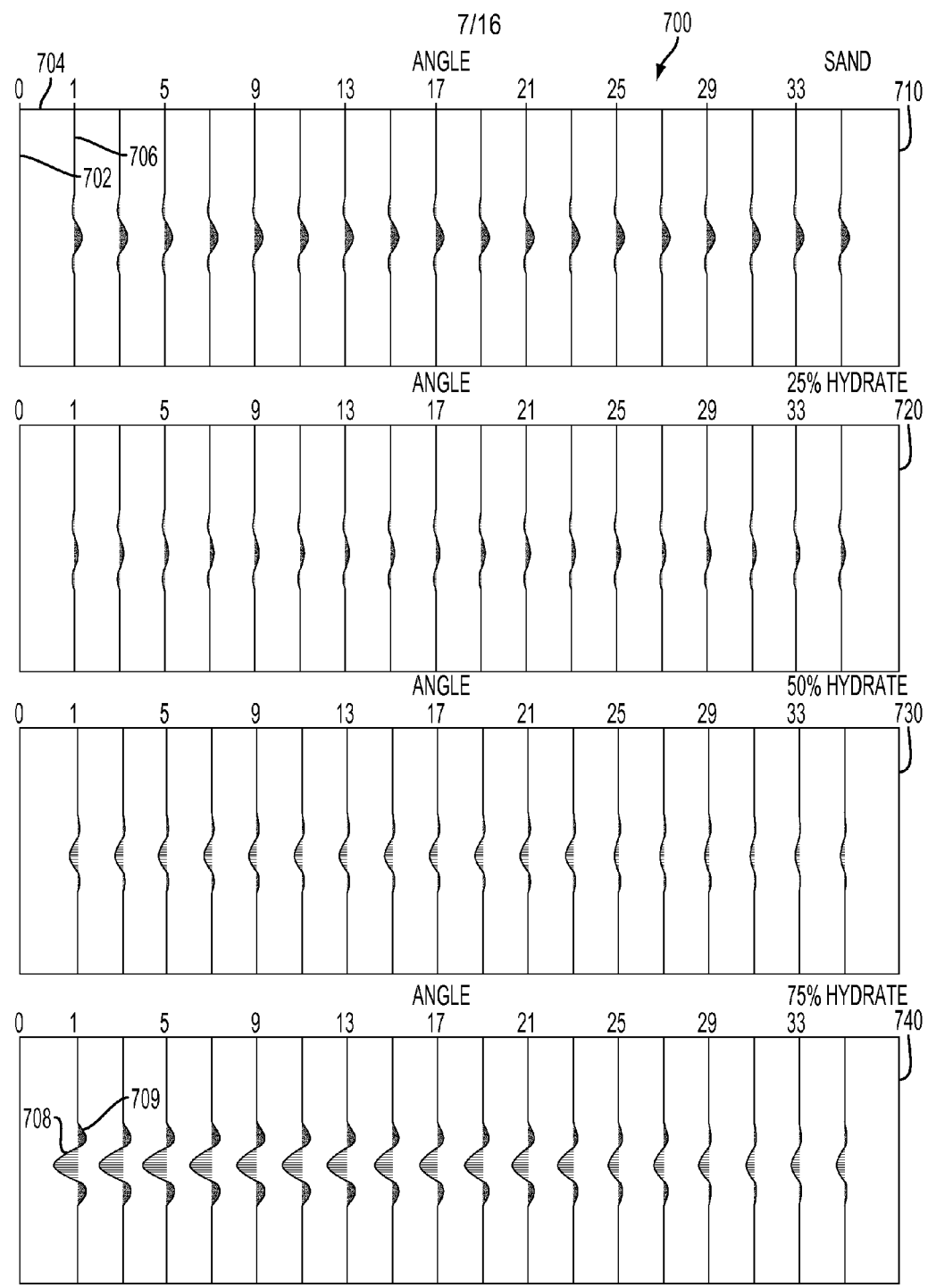
FIG. 7 discloses a series of seismic wiggle-trace panels showing seismic response for a number of incident angles for a sediment, the panels representing selected percentages of hydrate saturation of the sediment.

FIG. 7 discloses a series of seismic wiggle-trace panels 700 showing seismic response for a number of incident angles for a sediment, the panels representing selected hydrate saturation percentages of the sediment. The vertical axis 702 represents time or depth. The horizontal axis 704 is shown in degrees of incident angle of reflected seismic waves reflected off sediments ranging from 0 to 35. Seismic wiggle traces, for example seismic wiggle trace 706, are placed at selected incident angles along horizontal axis 704. A negative trough on a wiggle trace, for example negative trough 708, is represented by coarse horizontal lines, representing the color red. A positive peak on a wiggle trace, for example positive peak 709, is represented by fine horizontal lines, representing the color blue.

Panel 710 illustrates seismic amplitude response for sand. Panel 720 illustrates seismic amplitude response for sand with 25% hydrate. Panel 730 illustrates seismic amplitude response for sand with 50% hydrate. Panel 740 illustrates seismic amplitude response for sand with 75% hydrate.

Figure 8:
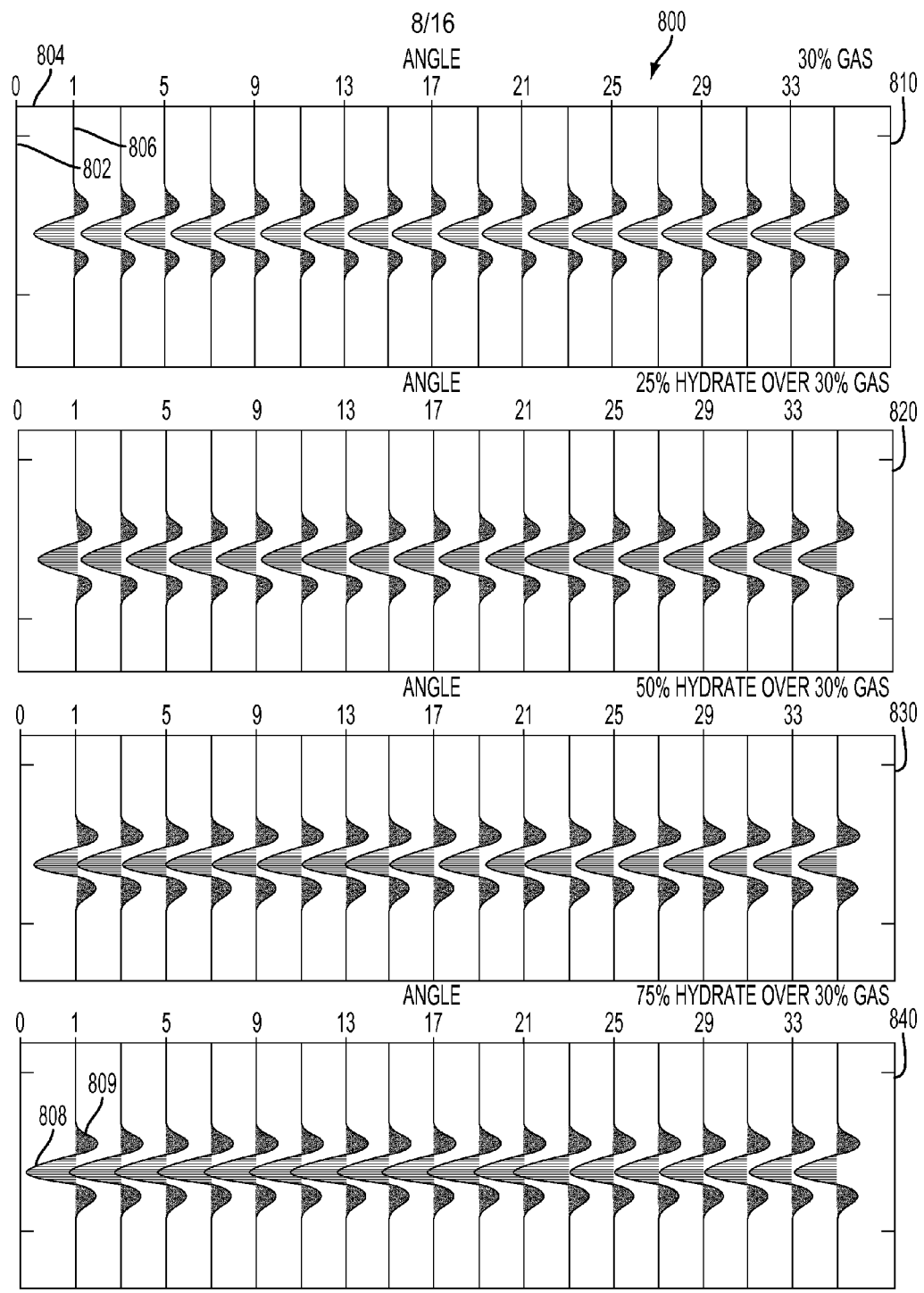
FIG. 8 discloses a series of seismic wiggle-trace panels showing seismic response for a number of incident angles for a sediment, the panels representing selected percentages of hydrate saturation overlying a sediment having 30% gas saturation.

FIG. 8 discloses a series of seismic wiggle-trace panels showing seismic response for a number of incident angles for a sediment, the panels representing selected hydrate saturation percentages overlying a sediment having 30% gas saturation. The vertical axis 802 represents time or depth. The horizontal axis 804 is shown in degrees of incident angle of reflected seismic waves reflected off sediments ranging from 0 to 35. Seismic wiggle traces, for example seismic wiggle trace 806, are placed at selected incident angles along horizontal axis 804. A negative trough on a wiggle trace, for example negative trough 808, is represented by coarse horizontal lines, representing the color red.

A positive peak on a wiggle trace, for example positive peak 809, is represented by fine horizontal lines, representing the color blue.

Panel 810 illustrates seismic amplitude response for sand having 30% gas (nil hydrate). Panel 820 illustrates seismic amplitude response for 25% hydrate over sand having 30% gas. Panel 830 illustrates seismic amplitude response 50% hydrate over sand having 30% gas. Panel 840 illustrates seismic amplitude response for 75% hydrate over sand having 30% gas.

Figure 9:
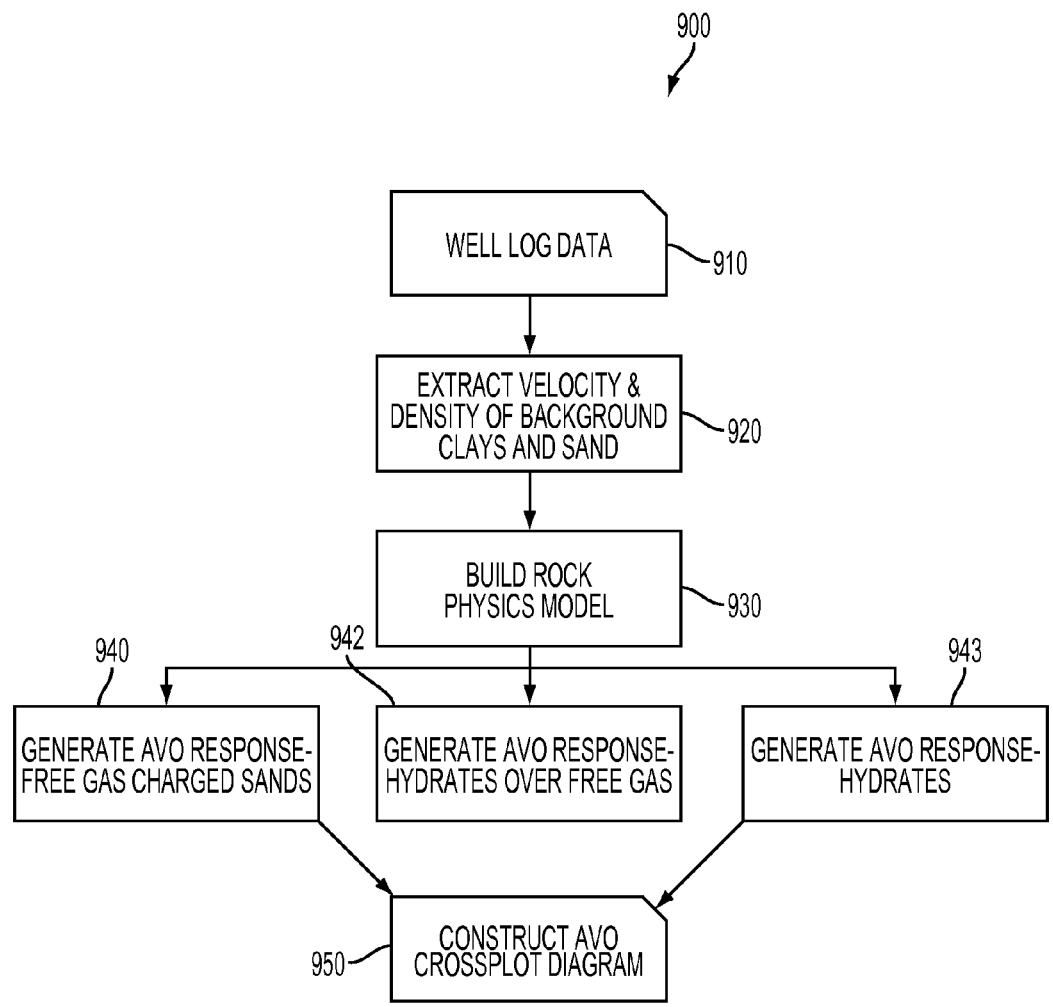
FIG. 9 discloses a flowchart representing an example of a method for indicating the presence of free gas charged sands, and/or hydrates over free gas, and/or hydrates not over free gas, the method using well log data and a rock physics model.

FIG. 9 discloses a flowchart 900 representing an example of a method for indicating the presence of free gas charged sands, and/or hydrates over free gas, and/or hydrates not over free gas, the method using well log data and a rock physics model. In one example, well log data 910 is used. Velocity and density of background clays and sands are extracted from well log data, step 920. The extracted velocities and densities of step 920 are used to build a rock physics model, step 930. The rock physics model of step 930 is used to generate an AVO response that is representative of free gas-charged sands, step 940. The AVO response is also called an AVO behavior. An AVO behavior, for example, is a set of seismic amplitude responses over a range of incident angles. The rock physics model of step 930 is used to generate an AVO response that is representative of hydrates over free gas-charged sands, step 942. The rock physics model of step 930 is used to generate an AVO response that is representative of hydrates (nil free gas), step 943. In one example, Shuey's approximation is used in generating the AVO response(s). In one example, the generated AVO responses of steps 940, 942, and 943 are used to construct an AVO crossplot diagram, step 950.

In one example, the generated AVO responses of one of steps 940, 942, and 943 are used to construct an AVO crossplot diagram, step 950.

In one example, the generated AVO responses of two of steps 940, 942, and 943 are used to construct an AVO crossplot diagram, step 950.

Figure 10:
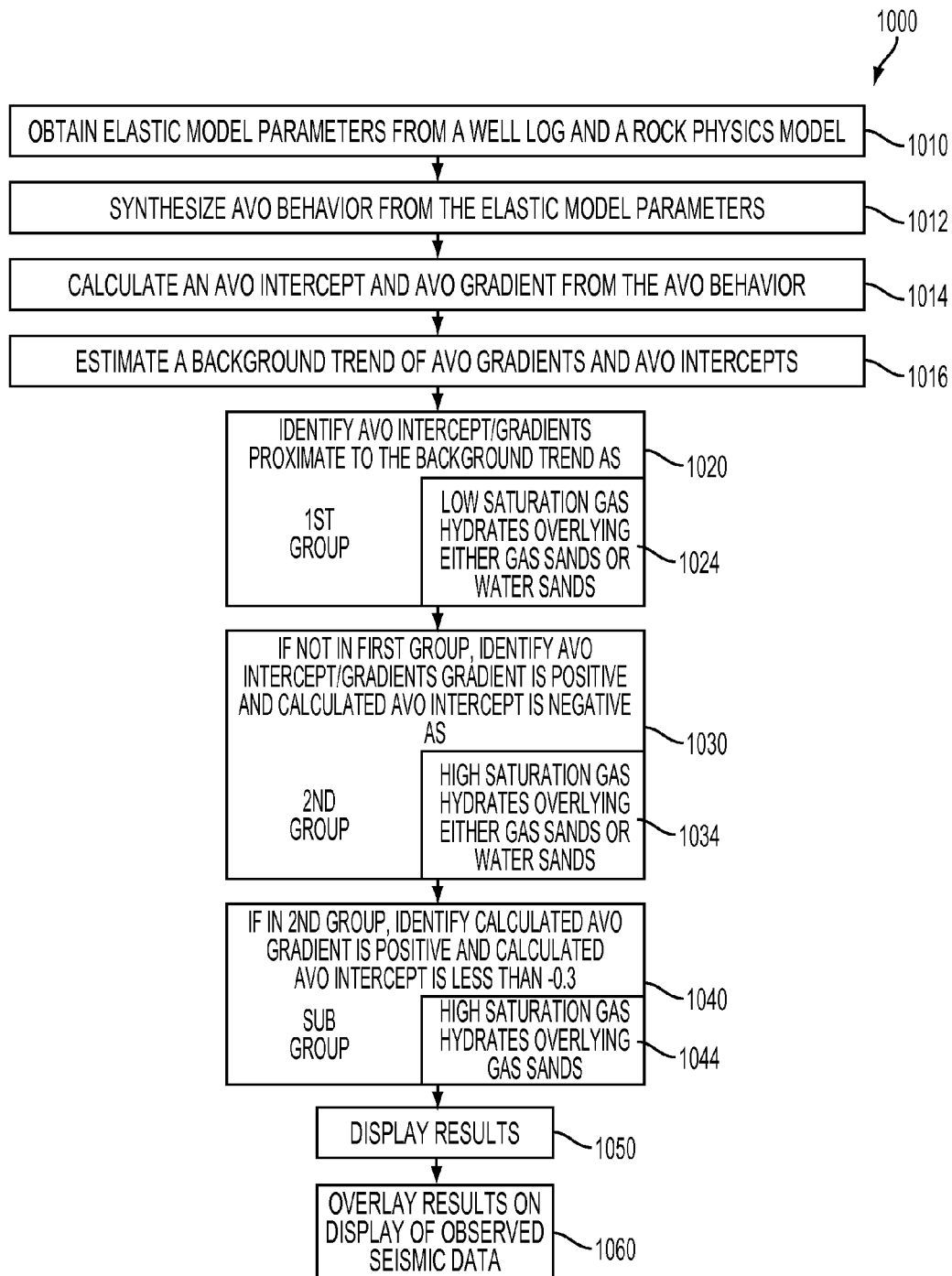
FIG. 10 discloses a flowchart representing an example of a method for indicating the presence of shallow gas, and/or gas hydrate bearing sediments, the method using well log data and a rock physics model.

FIG. 10 discloses a flowchart 1000 representing an example of a method for indicating the presence of shallow gas, and/or gas hydrate bearing sediments, the method using well log data and a rock physics model. Elastic model parameters are obtained from a well log and a rock physics model, step 1010. AVO behaviors are synthesized from the elastic model parameters, step 1012. In one example, Shuey's approximation is used in synthesizing the AVO behavior(s). In one example, AVO behaviors are constructed by varying source-to-receiver offset or incident angle to generate a set of synthetic seismic traces. For each AVO behavior, an AVO intercept and AVO gradient is calculated, step 1014. A background trend of AVO gradients and AVO intercepts is estimated from AVO gradients and AVO intercepts representing no gas or hydrates, step 1016. For example, Vp and/or Vs and/or density information for various clays over wet sands and/or wet sands over clays are extracted from the well log data. These data are then used to produce AVO gradients and AVO intercepts, which collectively will establish a background trend.

Step 1020, AVO gradient-intercept pairs representing weak AVO behavior are identified to form a first group. These AVO gradient-intercept pairs represent AVO behaviors for low saturation gas hydrates where the low saturation gas hydrates overlie either gas sands or water sands. The AVO gradient-intercept pairs are identified in that the AVO gradient and the AVO intercept pairs are proximate to the background trend, 1024.

Step 1030, AVO gradient-intercept pairs representing strong AVO behaviors are identified to form a second group. These AVO gradient-intercept pairs represent AVO behaviors for high saturation gas hydrates overlying either gas sands or water sands. The AVO gradient-intercept pairs are identified in that the AVO gradient and the AVO intercept pairs in the second grouping are not in the first grouping and have positive AVO gradients and negative AVO intercepts, 1034.

Step 1040, from the second group of pairs, AVO gradient-intercept pairs representing strong AVO behaviors and strong AVO intercept are identified to form a sub-group. These AVO gradient-intercept pairs represent AVO behaviors for high saturation gas hydrates overlying gas sands. The AVO gradient-intercept pairs are identified in that the AVO gradient and the AVO intercept pairs in the sub-group have AVO intercepts more negative than −0.3, 1044.

In one example, the three groupings of steps 1020, 1030, 1040 are displayed, step 1050. In one example the groupings are displayed in an intercept-gradient crossplot. In one example, AVO behaviors from seismic data are classified according to the groupings of steps 1020, 1030, 1040 and the resulting classifications are overlain on a display of the seismic data, step 1060. In one example, the display of seismic data is of the post-stack seismic and the AVO behaviors are extracted from the pre-stack seismic.

Figure 11:
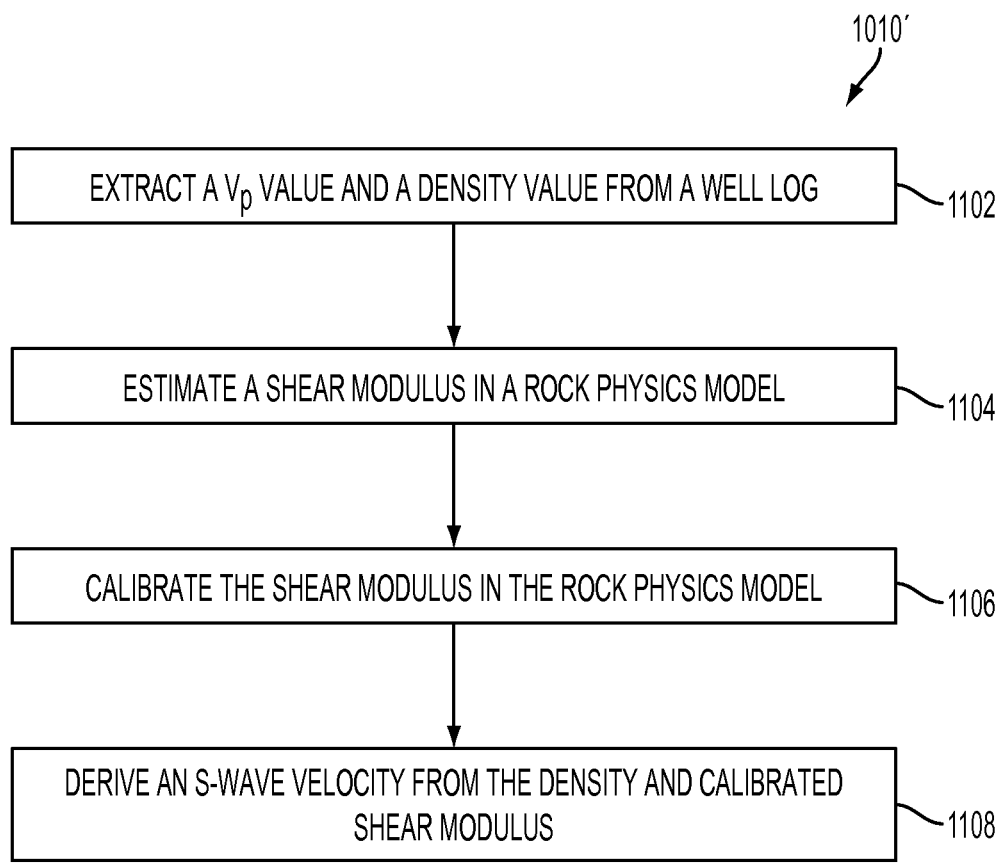
FIG. 11 discloses a flowchart representing an example detail of a method for obtaining elastic model parameters.

FIG. 11 discloses a flowchart 1010' representing an example detail of a method for obtaining elastic model parameters. A Vp value and a density value is extracted from a well log, step 1102. A shear modulus is estimated and placed into a rock physics model, step 1104. In one example, the shear modulus is calibrated in the rock physics model, step 1106. In one example, an adjustment to the estimated Vp value in the rock physics model is made to better match a well log Vp. The corresponding shear modulus calibration is performed to correspond with the Vp calibration. An S-wave velocity is derived from the density and the calibrated shear modulus, step 1108.

Figure 12:
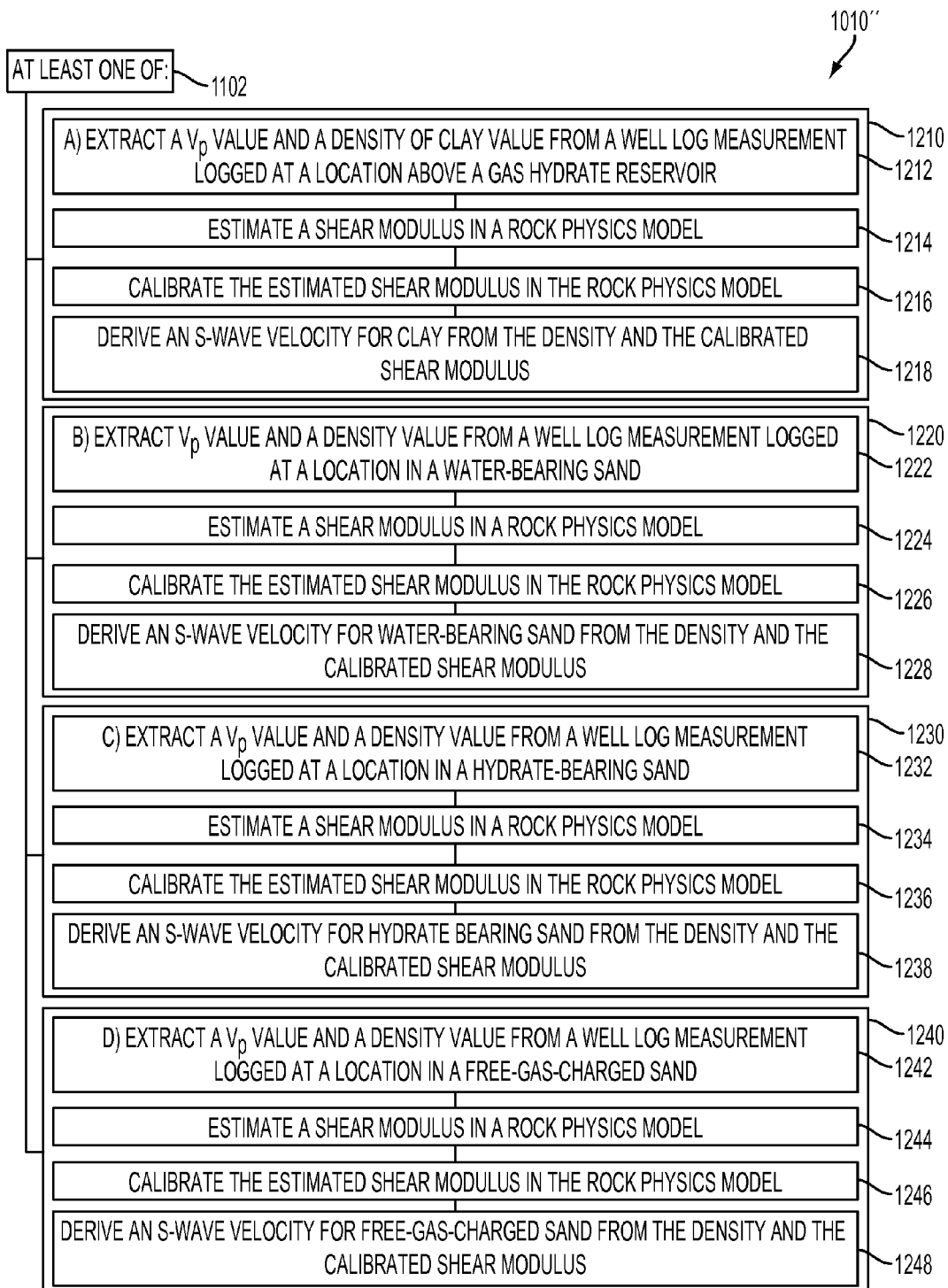
FIG. 12 discloses a flowchart representing an example detail of a method for obtaining elastic model parameters.

FIG. 12 discloses a flowchart 1010" representing an example detail of a method for obtaining elastic model parameters. At least one of the following groups of steps 1210, 1220, 1230, 1240 are executed, step 1102:

group 1210:
a Vp value and a density of clay value are extracted from a well log measurement logged at a location above a gas hydrate reservoir, step 1212;
a shear modulus is estimated and placed in a rock physics model, step 1214;
the shear modulus is calibrated in the rock physics model, step 1216;
an S-wave velocity for clay is derived from the density and the calibrated shear modulus, step 1218;

group 1220:
a Vp value and a density value are extracted from a well log measurement logged at a location in a water-bearing sand, step 1222;
a shear modulus is estimated and placed in a rock physics model, step 1224;
the shear modulus is calibrated in the rock physics model, step 1226;
an S-wave velocity for water-bearing sand is derived from the density and the calibrated shear modulus, step 1228;

group 1230:
a Vp value and a density value are extracted from a well log measurement logged at a location in a hydrate-bearing sand, step 1232;

a shear modulus is estimated and placed in a rock physics model, step 1234;

the shear modulus is calibrated in the rock physics model, step 1236;

an S-wave velocity for hydrate-bearing sand is derived from the density and the calibrated shear modulus, step 1238;

group 1240:

a Vp value and a density value are extracted from a well log measurement logged at a location in a free-gas-charged sand, step 1242;

a shear modulus is estimated and placed in a rock physics model, step 1244;

the shear modulus is calibrated in the rock physics model, step 1246;

an S-wave velocity for free-gas-charged sand is derived from the density and the calibrated shear modulus, step 1248.

In one example, a method for obtaining elastic model parameters includes executing one of the following groups of steps 1210, 1220, 1230, 1240.

In one example, a method for obtaining elastic model parameters includes executing two of the following groups of steps 1210, 1220, 1230, 1240.

In one example, a method for obtaining elastic model parameters includes executing three of the following groups of steps 1210, 1220, 1230, 1240.

In one example, a method for obtaining elastic model parameters includes executing all of the following groups of steps 1210, 1220, 1230, 1240.

Figure 13:
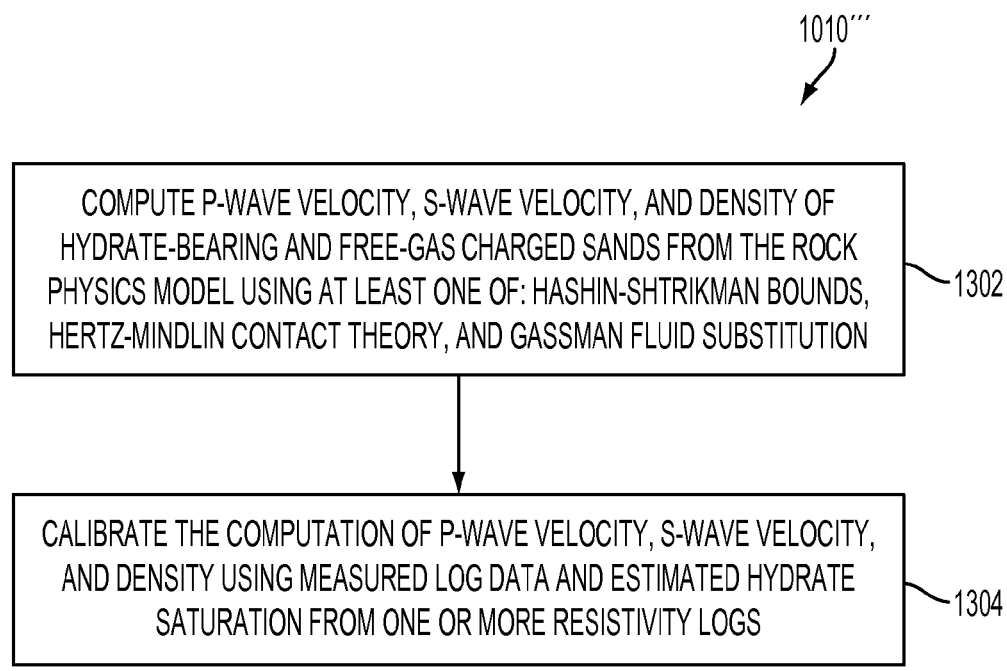
FIG. 13 discloses a flowchart representing an example detail of a method for obtaining elastic model parameters.

FIG. 13 discloses a flowchart 1010''' representing an example detail of a method for obtaining elastic model parameters. P-wave velocity, S-wave velocity, and density of hydrate-bearing and free-gas charged sands are computed from the rock physics model using at least one of: Hashin-Shtrikman bounds, Hertz-Mindlin contact theory, and Gassman fluid substitution, step 1302. The computation of P-wave velocity, S-wave velocity, and density is calibrated using measured log data and estimated hydrate saturation from one or more resistivity logs, step 1304.

In one example for step 1302, P-wave velocity, S-wave velocity, and density of hydrate-bearing and free-gas charged sands are computed from the rock physics model using one of: Hashin-Shtrikman bounds, Hertz-Mindlin contact theory, and Gassman fluid substitution.

In one example for step 1302, P-wave velocity, S-wave velocity, and density of hydrate-bearing and free-gas charged sands are computed from the rock physics model using two of: Hashin-Shtrikman bounds, Hertz-Mindlin contact theory, and Gassman fluid substitution.

In one example for step 1302, P-wave velocity, S-wave velocity, and density of hydrate-bearing and free-gas charged sands are computed from the rock physics model using Hashin-Shtrikman bounds, Hertz-Mindlin contact theory, and Gassman fluid substitution.

Figure 14:
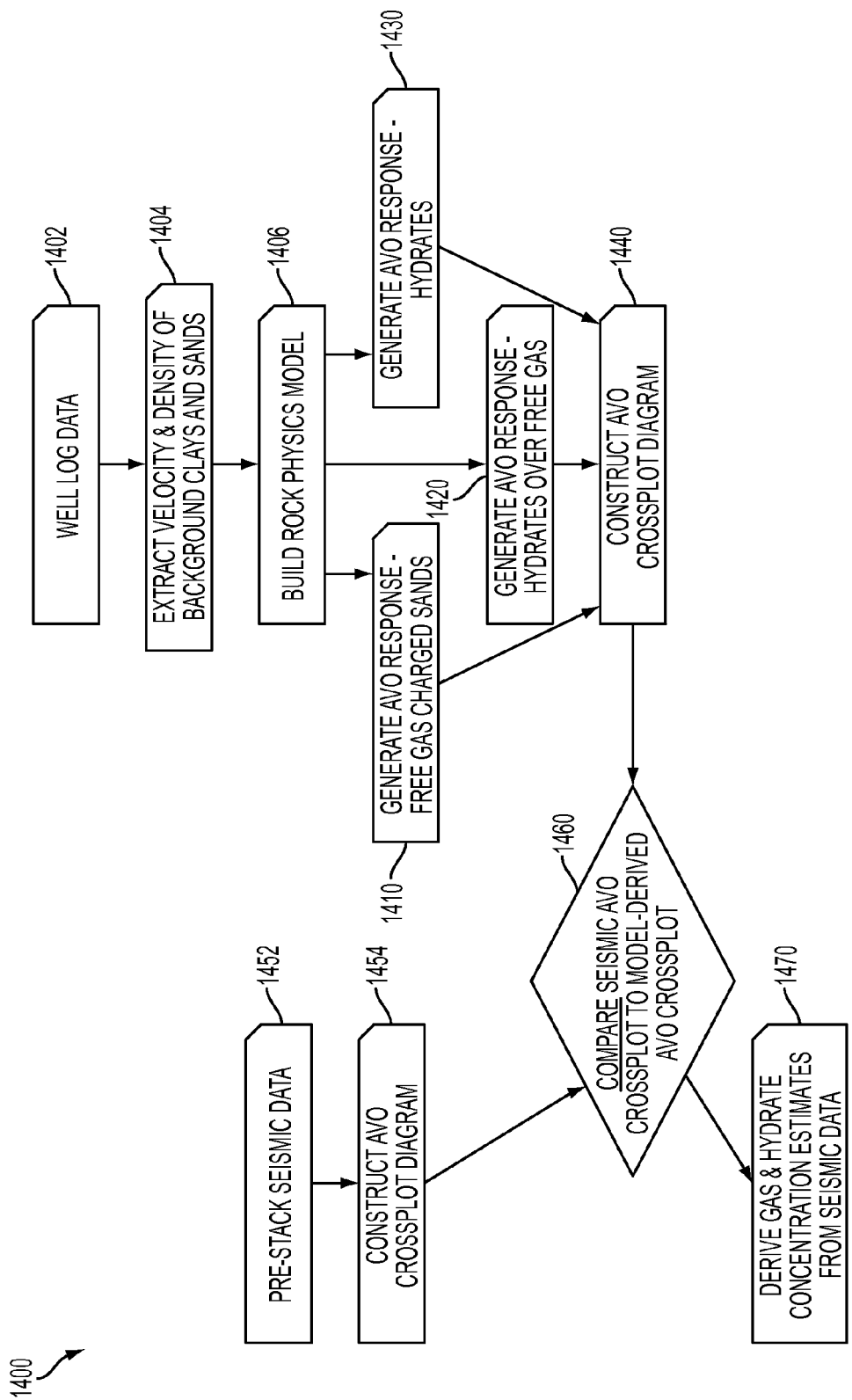
FIG. 14 discloses a flowchart representing an example of a method for indicating the presence of free gas charged sands, and/or hydrates over free gas, and/or hydrates not over free gas, the method using observed pre-stack seismic data, well log data and a rock physics model.

FIG. 14 discloses a flowchart 1400 representing an example of a method for indicating the presence of free gas charged sands, and/or hydrates over free gas, and/or hydrates not over free gas, the method using observed pre-stack seismic data, well log data and a rock physics model. In one example, well log data 1402 is used. In one example, pre-stack seismic data 1452 is used. Velocity and density of back ground clays and sands are extracted from well log data 1402, step 1404. Using extracted velocities and densities of step 1404, a rock physics model is built, step 1406. Using the built rock physics model of step 1406, an AVO response for free gas charged sands is generated, step 1410. Using the built rock physics model of step 1406, an AVO response for hydrates over free gas is generated, step 1420. Using the built rock physics model of step 1406, an AVO response for hydrates is generated, step 1430. In one example, Shuey's approximation is used in generating the AVO response(s). An AVO crossplot diagram is constructed, step 1440, from the AVO responses of steps 1410, 1420, and 1430. An AVO crossplot diagram is constructed, step 1454, using the pre-stack seismic data 1452. The seismic constructed AVO crossplot of step 1454 is compared to the constructed AVO response crossplot of step 1440, step 1460. Gas and hydrate concentration estimates are derived from the crossplot comparison of step 1460, step 1470.

In one example, the derived concentration estimates of step 1470 are displayed in relation to their location on the stacked seismic section representative of pre-stack seismic data 1452. In a particular example, the derived concentration estimates of step 1470 are displayed in relation to their location by overlaying on the stacked seismic section.

Figure 15:
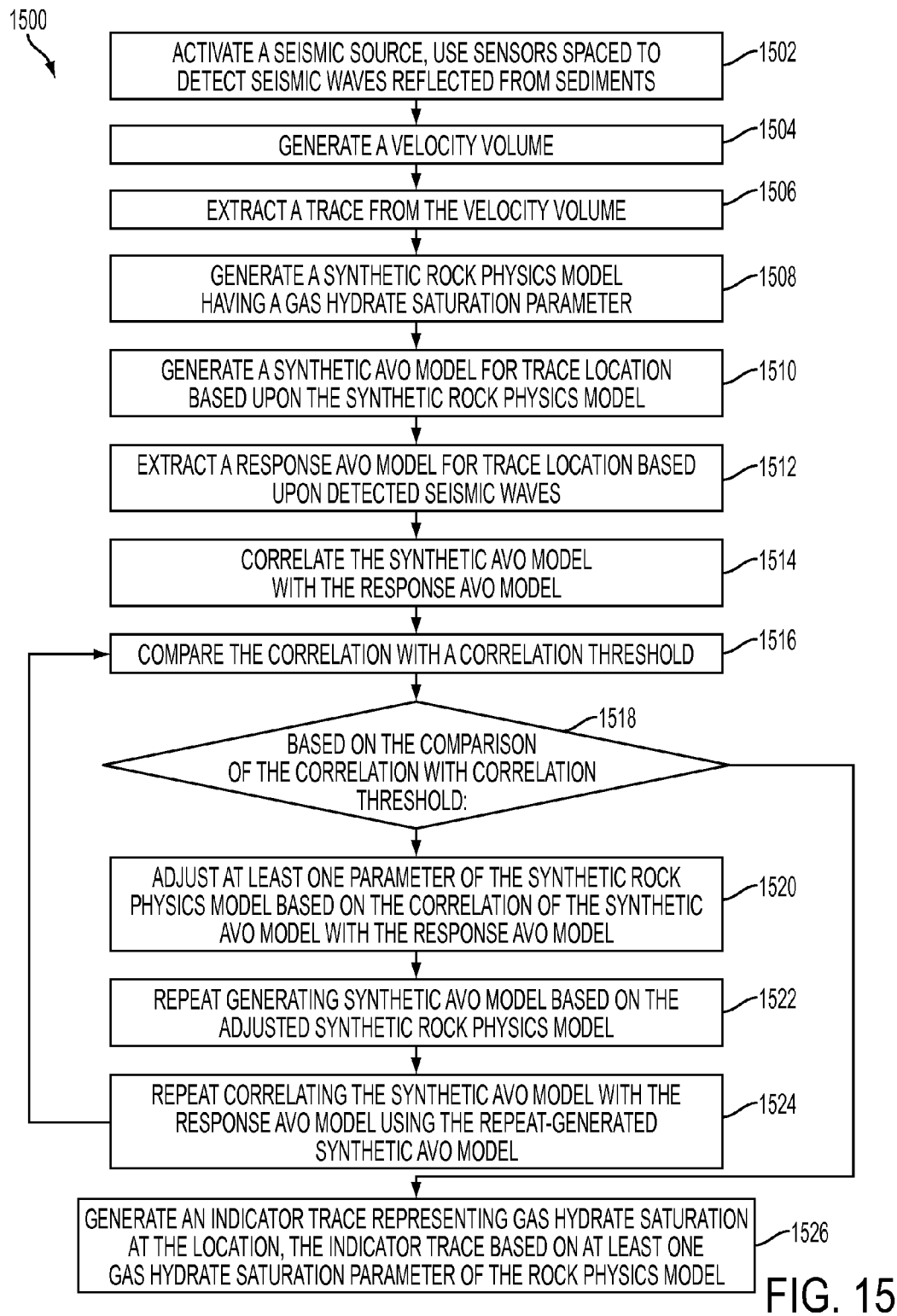
FIG. 15 discloses a flowchart representing an example method for indicating the presence of gas hydrate bearing sediments, the method including activating a seismic source and generating an indicator trace.

FIG. 15 discloses a flowchart 1500 representing an example method for indicating the presence of gas hydrate bearing sediments, the method including activating a seismic source and generating an indicator trace. In step 1502, a seismic source is activated and spaced seismic sensors are used to detect seismic waves that are reflected from sediments. In one example, the seismic source is activated in at least one location to propagate seismic waves into the earth. A plurality of seismic sensors is spaced from the seismic source. These seismic sensors are used to detect the seismic waves as they reflect from sediments. In one example, a typical marine seismic acquisition survey is used to detect the seismic waves reflected from sediments, the marine seismic survey providing a plurality of source location to sensor location distances such that a plurality of incident-reflection angles are available in the detected seismic waves at particular spatial locations in the sediments. In seismic processing terminology, a plurality of seismic traces having a common depth point is provided, with these seismic traces having a variety of differing source to receiver offsets.

In step 1504, a velocity volume is generated. A trace is extracted from the velocity volume, step 1506. The trace that is extracted from the volume represents a spatial location. In seismic processing, in one example, a velocity volume is maintained in a 3-D volume seismic trace format. In one example, the velocity volume may be 2-D, and in further example, the 2-D set may be maintained in a (2-D) seismic trace format. In one example, a step 1506 extracted trace is a profile of velocity versus depth. Here, depth may be taken to mean either depth units or time units, as appropriate for the z-direction scaling of the seismic data and velocity volume. In step 1508, a synthetic rock physics model is generated, the synthetic rock physics model having at least a gas hydrate saturation parameter. In one example, velocity information from the velocity volume is used to generate the synthetic rock physics model. A synthetic AVO model is generated for the extracted trace spatial location, step 1510. In one example, Shuey's approximation is used in generating the AVO model. In one example, the synthetic AVO model is based upon the synthetic rock physics model.

In step 1512, a response AVO model is extracted (or "constructed") for the extracted trace spatial location. In one example, the response AVO model is based upon the detected seismic waves. For example, in seismic processing terminology, a pre-stack gather at a common depth point is used to construct the response AVO model. The common depth point is the spatial location corresponding to the extracted trace from the velocity volume (velocity model). In step 1514, the synthetic AVO model is correlated with the response AVO model.

The correlation of step 1514 is compared to a correlation threshold, step 1516. In one example, the correlation threshold is pre-determined. In one example, a minimum correlation coefficient value is set for the threshold. In one example, the correlation threshold is adaptive. Based on the comparison, a decision 1518 is made whether to proceed with performing steps 1520, 1522, and 1524. If not, the method proceeds with step 1526. (In one example, other intermediate steps may occur prior to proceeding with step 1526. For example, in an executing computer system, many execution steps occur which are not detailed here.)

In step 1520, at least one parameter of the synthetic rock physics model is adjusted. The adjustment is based on the correlation of the synthetic AVO model with the response AVO model. In step 1522, the synthetic AVO model is regenerated using the at least one adjusted parameter, the repeated generation of the synthetic AVO model is based on the adjusted rock physics model. In step 1524, the regenerated synthetic AVO model of step 1522 is correlated with the response AVO model. In one example, steps 1516 and 1518 are repeated, with step 1516 using the correlation of step 1524 in its comparison with the correlation threshold.

In step 1526, an indicator trace is generated. The indicator trace represents gas hydrate saturation at the extracted trace spatial location. The indicator trace is based on at least one gas hydrate saturation parameter of the rock physics model. For example, the rock physics model has been iteratively adjusted until the correlation of the synthetic AVO model to the response AVO model compares to each other, within a correlation threshold. The gas hydrate saturation parameter from the adjusted rock physics model is now a reasonable estimation of the true gas hydrate saturation at the real-world spatial location represented by the velocity data trace that was extracted from the velocity volume. A trace, called an indicator trace, is prepared which uses the gas hydrate saturation parameter(s) from the adjusted rock physics model. More than one parameter may exist for the spatial location, as there may exist gas hydrate saturation parameter values associated with one or more depths.

In one example, a plurality of indicator traces are generated for a plurality of extracted trace spatial locations. The collection of these traces assemble to create a 2-D (or, in one example, a 3-D) display for further correlation or comparison to corresponding stacked seismic traces.

In one example the detected seismic waves of step 1502 are already provided, for example, in an already acquired seismic data set or volume. In one example, the velocity volume or profile of step 1504 is already provided. In one example, both detected seismic waves of step 1502 and velocity volume or profile of step 1504 are already provided.

Figure 16:
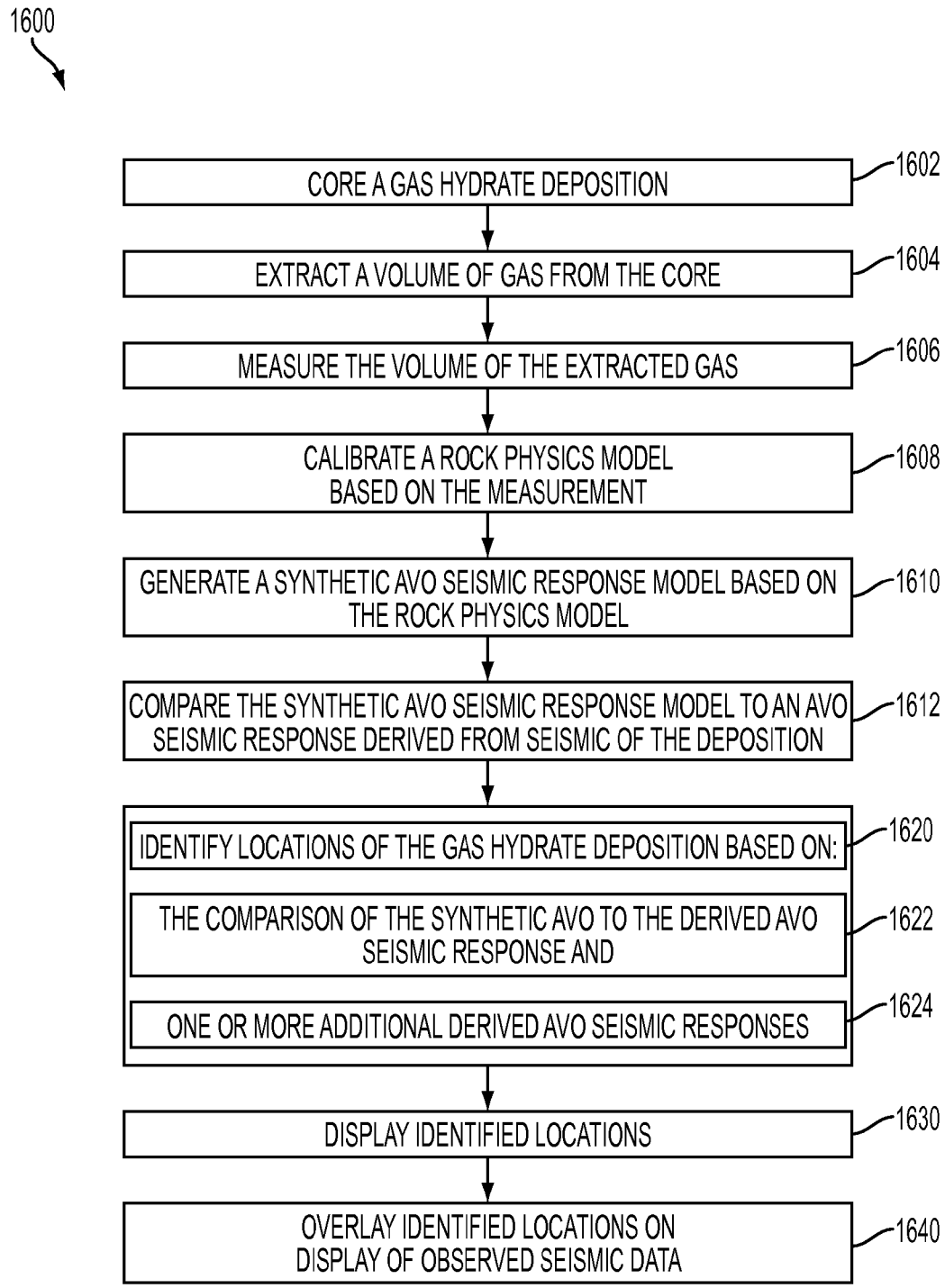
FIG. 16 discloses a flowchart representing an example method for prospecting for gas hydrates, the method including calibrating a rock physics model to a core measurement.

FIG. 16 discloses a flowchart 1600 representing an example method for prospecting for gas hydrates, the method including calibrating a rock physics model to a core measurement. A core sample is taken of a gas hydrate deposit in the earth, step 1602. In one example of the method, the core sample(s) is/are already taken. In step 1604, a volume of gas is extracted from the core sample. Step 1606, the volume of extracted gas is measured. In one example, the measurement is by direct method, for example, degassing. In one example, the measurement is by indirect method, examples include: by log measurement, x-ray, other imaging, pore water chlorinity measurements. In one example, the core sample and measurement of extracted gas had already been performed. In one example, the measurement of the extracted gas is replaced by Step 1608, a rock physics model is calibrated based on the volume measurement. In one example, the rock physics model uses information from well logs in addition to volume measurement derived from the core. In one example, one or more parameters are measured from a core sample and those one or more measured parameters are used to infer a volume measurement for use in calibrating a rock physics model. In one example, inferred gas volume of a core is used to calibrate a rock physics model. In some of these examples, where the core and/or core measurements have already been taken, the method of the invention begins with Step 1608. Step 1610, a synthetic AVO seismic response model is generated, based on the rock physics model. In one example, Shuey's approximation is used in generating the AVO response. Step 1612, the synthetic AVO seismic response model is compared to a derived AVO seismic response. The derived AVO seismic response is derived from seismic data soundings of the gas hydrate deposition. Step 1620, locations of the gas hydrate deposition are identified. The identification is based on: identifying locations of the gas hydrate deposition based on: the comparison step 1612 of the synthetic AVO seismic response model to the derived AVO seismic response (1622) and one or more additional derived AVO seismic responses derived from seismic data soundings (1624). In one example, a display is generated of the identified locations, step 1630. In one example, identified locations are overlain on a display of observed seismic data, step 1640.

The comparison of the synthetic AVO to the derived AVO at the location of the core sample provides a basis for identifying gas hydrates in derived AVO's at other locations in the seismic data set. Thus, the mapping of the synthetic AVO to the derived AVO behavior allows for associating similar AVO behaviors located spatially elsewhere in the relevant portions of the seismic data. In one example, the rock physics model is calibrated based on well log data. In situations where a core sample is not used, for example, the rock physics model is calibrated using one or more of the various examples described elsewhere in this application (for example, flowchart 900, 1010, 1010', 1010", 1010''' and associated alternate examples).

From the description contained herein, the features of any of the examples, especially as set forth in the claims, can be combined with each other in any meaningful manner to form further examples and/or embodiments. It is to be further appreciated that, in some examples, some or all method steps are executed automatically by a programmable computer system.

It is contemplated that in further examples, the invention, including each of the aforementioned methods and examples, is practiced on a computer system specifically configured to execute the processing steps required to analyze and produce displays of the resulting data. In one example, the invention is practiced on a computer system specifically configured to execute the processing steps required to analyze and produce an output data set that may be stored and used at a later time for prospecting and/or shallow hazard investigation purposes. In a particular example, the specially produced output data set is formatted into a set of 2-D or 3-D traces of type similar to seismic data trace sets or volumes used for seismic interpretation work. In further example, the processing steps required to configure the computer system are placed in the form of programming code executable by a computing device, the programming code placed on a tangible, non-transient media that is readable by a computer system. Each of the aforementioned methods The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to explain the best mode for practicing the invention, and to enable others skilled in the art to utilize the invention and such or other embodiments and with various modifications required by the particular applications or uses of the invention.

We claim:

1. A method for indicating the presence of gas hydrate bearing sediments comprising:
   obtaining elastic model parameters from a well log and a rock physics model;
   synthesizing a plurality of AVO behaviors from the elastic model parameters wherein an AVO behavior is defined as the variation of seismic reflection amplitude with source-to-receiver offset angle;
   calculating an AVO intercept and AVO gradient pair from each synthesized AVO behavior;
   estimating a background trend of AVO gradients and AVO intercepts representing no gas or hydrates;
   identifying, from the plurality of AVO gradient-intercept pairs, a first grouping of intercept pairs representing AVO behaviors for low saturation gas hydrates overlying either gas sands or water sands;
   identifying a second grouping of pairs representing AVO behaviors for high saturation gas hydrates overlying either gas sands or water sands;
   from the second grouping of pairs, identifying a sub-grouping of pairs representing AVO behaviors for high saturation gas hydrates overlying gas sands;
   wherein the AVO gradient and the AVO intercept pairs identified in the first grouping are proximate to the background trend;
   wherein the AVO gradient and the AVO intercept pairs identified in the second grouping are not in the first grouping and have positive AVO gradients and negative AVO intercepts; and
   wherein the AVO gradient and the AVO intercept pairs identified in the sub-grouping have AVO intercepts more negative than −0.3.

2. The method of claim 1 comprising:
   extracting an AVO behavior from pre-stack seismic data at a location;
   calculating an AVO intercept and AVO gradient pair for the extracted seismic AVO behavior;
   comparing the calculated seismic intercept and AVO gradient pair to the first grouping, second grouping, and sub-grouping; and
   determining the presence of hydrate or hydrate-over-gas sediments from the comparison.

3. The method of claim 2 comprising storing the location of the determined presence of hydrate or hydrate-over-gas sediments in a non-transient computer readable storage medium.

4. The method of claim 1 wherein the elastic model parameters comprise Vp, Vs, and density.

5. The method of claim 1 wherein obtaining elastic model parameters comprises:
   extracting a Vp value and a density value from a well log;
   estimating and calibrating a shear modulus in the rock physics model; and
   deriving an S-wave velocity from the density and the estimated and calibrated shear modulus.

6. The method of claim 1 wherein obtaining elastic model parameters comprises at least one of:
   a) extracting a Vp value and a density of clay value from a well log measurement logged at a location above a gas hydrate reservoir;
   estimating and calibrating a shear modulus in the rock physics model;
   deriving an S-wave velocity for clay from the density and the estimated and calibrated shear modulus;
   b) extracting a Vp value and a density value from a well log measurement logged at a location in a water-bearing sand;
   estimating and calibrating a density and shear modulus in the rock physics model;
   deriving an S-wave velocity for water-bearing sand from the density and the estimated and calibrated shear modulus;
   c) extracting a Vp value and a density value from a well log measurement logged at a location in a hydrate-bearing sand;
   estimating and calibrating a density and shear modulus in the rock physics model;
   deriving an S-wave velocity for hydrate-bearing sand from the density and the estimated and calibrated shear modulus;
   d) extracting a Vp value and a density value from the a well log measurement logged at a location in a free-gas-charged sand;
   estimating and calibrating a density and shear modulus in the rock physics model; and
   deriving an S-wave velocity for free-gas-charged sand from the density and the estimated and calibrated shear modulus.

7. The method of claim 1 wherein obtaining elastic model parameters comprises:
   computing P-wave velocity, S-wave velocity, and density of hydrate-bearing and free-gas-charged sands from the rock physics model using at least one of: Hashin-Shtrikman bounds, Hertz-Mindlin contact theory, and Gassman fluid substitution; and
   calibrating the computation of P-wave velocity, S-wave velocity, and density using measured log data and estimated hydrate saturation from one or more resistivity logs.

8. The method of claim 1 wherein synthesizing an AVO behavior comprises applying Shuey's approximation.

9. The method of claim 1 used for identifying subsurface drilling hazards in deepwater.

10. The method of claim 1 used for differentiating hydrate-over-gas bearing sediment drilling hazards from hydrate-bearing sediments, without free gas below, drilling hazards.

11. A method for indicating the presence of gas hydrate bearing sediments comprising:
   activating a seismic source in at least one location to propagate seismic waves into the earth, using a plurality of seismic sensors spaced apart from the seismic source to detect seismic waves reflected from sediments;
   generating a velocity volume;
   extracting a trace from a spatial location from the velocity volume;
   generating a synthetic rock physics model having a gas hydrate saturation parameter;

generating a synthetic AVO model for the extracted trace spatial location, the synthetic AVO model based upon the synthetic rock physics model;

extracting a response AVO model for the extracted trace spatial location, the response AVO model based upon the detected seismic waves;

correlating the synthetic AVO model with the response AVO model;

comparing the correlation with a correlation threshold;

performing, based on the comparison of the correlation with said correlation threshold:

adjusting at least one parameter of the synthetic rock physics model based on the correlation of the synthetic AVO model with the response AVO model;

repeating the generating a synthetic AVO model step based on the adjusted synthetic rock physics model; and repeating the correlating the synthetic AVO model with the response AVO model step using the repeated generated synthetic AVO model; and generating an indicator trace representing gas hydrate saturation at the extracted trace spatial location, the indicator trace based on at least one gas hydrate saturation parameter of the rock physics model.

12. A method for prospecting for gas hydrates, comprising:

coring a gas hydrate deposition deposited in the earth, whereby a core sample is obtained;

determining a volume of extracted gas from the core sample;

calibrating a rock physics model based on the volume determination;

generating a synthetic AVO seismic response model based on the rock physics model;

comparing the synthetic AVO seismic response model to a derived AVO seismic response, the derived AVO seismic response derived from seismic data soundings of the gas hydrate deposition; and identifying locations of the gas hydrate deposition based on:

a) the comparison of the synthetic AVO seismic response model to said derived AVO seismic response; and b) one or more additional derived AVO seismic responses derived from seismic data soundings.

13. The method of claim 12 wherein determining a volume is by a direct method.

14. The method of claim 12 wherein determining a volume is by degassing the core sample.

15. The method of claim 12 wherein determining a volume is by indirect method.

16. The method of claim 12 wherein determining a volume is by x-raying the core sample.

17. The method of claim 12 wherein determining a volume is based in part by measuring pore water chlorinity of the core sample.

18. A tangible computer readable medium having computer executable logic recorded thereon, comprising:

code for reading a rock physics model;

code for generating AVO responses for free gas charged sands from the rock physics model;

code for generating AVO responses for hydrates over free gas from the rock physics model;

code for generating AVO responses for hydrates, not over free gas, from the rock physics model; and code for cross-plotting the three sets of AVO responses onto an AVO cross-plot diagram.

19. The tangible computer readable medium of claim 18 further comprising:

code for reading pre-stack seismic data;

code for constructing an AVO cross-plot from the pre-stack seismic data;

code for comparing the AVO cross-plot from the pre-stack seismic data with the AVO cross-plot of the three sets of AVO responses;

code for deriving gas and hydrate concentration estimates from the comparison.

20. The tangible computer readable medium of claim 19 further comprising code for displaying the AVO cross-plot from the pre-stack seismic data with the AVO cross-plot of the three sets of AVO responses.

* * * * *